United States Patent
Kameno et al.

(10) Patent No.: US 10,809,684 B2
(45) Date of Patent: Oct. 20, 2020

(54) PLANT OPERATION APPARATUS, PLANT OPERATION METHOD, AND PLANT OPERATION PROGRAM

(71) Applicant: KABUSHIKI KAISHA TOSHIBA, Minato-ku (JP)

(72) Inventors: Noriko Kameno, Chofu (JP); Masayuki Tobo, Kawasaki (JP); Kazuna Sawata, Yokohama (JP); Tatsuharu Kamei, Kiyose (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 711 days.

(21) Appl. No.: 15/007,587

(22) Filed: Jan. 27, 2016

(65) Prior Publication Data
US 2016/0341076 A1   Nov. 24, 2016

(30) Foreign Application Priority Data
May 22, 2015   (JP) .................. 2015-104572

(51) Int. Cl.
G05B 19/042   (2006.01)
F01K 23/10    (2006.01)
(Continued)

(52) U.S. Cl.
CPC .......... *G05B 19/042* (2013.01); *F01K 23/101* (2013.01); *F02C 9/42* (2013.01);
(Continued)

(58) Field of Classification Search
CPC ............... G05B 19/0426; G05B 15/02; G05B 2219/23258; G05B 23/0267;
(Continued)

(56) References Cited

U.S. PATENT DOCUMENTS 5,428,555 A   6/1995  Starkey et al.
5,576,946 A   11/1996 Bender et al.
(Continued)

FOREIGN PATENT DOCUMENTS

CN   101649757 A   2/2010
CN   103291463 A   9/2013
(Continued)

OTHER PUBLICATIONS

Extended European Search Report dated Oct. 18, 2016 in Patent Application No. 16153048.0.

*Primary Examiner* — Robert E Fennema
*Assistant Examiner* — Shon G Foley
(74) *Attorney, Agent, or Firm* — Oblon, McClelland, Maier & Neustadt, L.L.P.

(57) ABSTRACT

A plant operation apparatus according to an embodiment operates a multi-shaft combined-cycle power plant including at least a plurality of gas turbines as a plurality of devices to be operated. The plant operation apparatus includes an interactive processing unit and a display unit. The interactive processing unit can display on the display unit an activation setting screen on which activation sequence in an activation operation of the gas turbines and number of gas turbines to be in an operating state after the activation operation can be selected, and/or a shutdown setting screen on which shutdown sequence in a shutdown operation of the gas turbines and number of gas turbines to be in an operating state after the shutdown operation can be selected.

5 Claims, 17 Drawing Sheets

(51) Int. Cl.
  *F02C 9/42* (2006.01)
  *G05B 19/409* (2006.01)
  *G05B 19/418* (2006.01)

(52) U.S. Cl.
  CPC ..... *G05B 19/409* (2013.01); *G05B 19/41835* (2013.01); *G05B 2219/14116* (2013.01); *G05B 2219/34315* (2013.01); *Y02B 70/3241* (2013.01); *Y02E 20/16* (2013.01); *Y04S 20/227* (2013.01)

(58) Field of Classification Search
  CPC .... G05B 19/41865; G05B 2219/14116; G05B 2219/34315; G05B 19/409; G05B 19/41835; G05B 19/042; G06Q 10/06; G06F 8/34; G06F 3/0481; G06F 3/0484; F01K 23/101; F02C 9/42; Y04S 20/227; Y02B 70/3241; Y02E 20/16
  See application file for complete search history.

(56) References Cited

U.S. PATENT DOCUMENTS

| | | |
|---|---|---|
| 5,777,896 A | 7/1998 | Arita et al. |
| 7,949,422 B1* | 5/2011 | Little ............... G05B 19/056 700/17 |
| 8,195,339 B2 | 6/2012 | Long et al. |
| 8,352,148 B2 | 1/2013 | D'Amato et al. |
| 8,626,420 B2 | 1/2014 | Gaffney et al. |
| 2003/0060899 A1 | 3/2003 | Lipner et al. |
| 2005/0097374 A1* | 5/2005 | Aharonian ............ G06F 1/30 713/300 |
| 2006/0178782 A1 | 8/2006 | Pechtl et al. |
| 2007/0022733 A1 | 2/2007 | Sako et al. |
| 2011/0071692 A1 | 3/2011 | D'Amato et al. |
| 2011/0301764 A1* | 12/2011 | Lapierre ............ G05B 19/0426 700/275 |
| 2012/0038650 A1* | 2/2012 | Heller ............... G05B 19/058 345/440 |
| 2016/0266728 A1* | 9/2016 | Sankhavaram .... G06Q 10/0633 |
| 2016/0300551 A1* | 10/2016 | Branthomme ......... G09G 5/363 |

FOREIGN PATENT DOCUMENTS

| | | |
|---|---|---|
| EP | 1 643 099 A1 | 4/2006 |
| EP | 2 312 407 A2 | 4/2011 |
| JP | 2011-69356 A | 4/2011 |
| JP | 2015-227633 A | 12/2015 |
| KR | 10-2009-0121248 A | 11/2009 |

* cited by examiner

| No. | ATTRIBUTES | ACTIVATION DETAILS | SHUTDOWN DETAILS |
|---|---|---|---|
| 1 | OPERATION PHASE | ACTIVATION | SHUTDOWN |
| 2 | COMPONENTS | NUMBER OF GAS TURBINES GT IN OPERATING STATE AFTER ACTIVATION OPERATION: 1 TO 3 | NUMBER OF GAS TURBINES GT IN OPERATING STATE AFTER SHUTDOWN OPERATION: 0 TO 2 |
| 3 | ORDER | GT ACTIVATION SEQUENCE | GT SHUTDOWN SEQUENCE |
| 4 | SHUTDOWN MODE OF STEAM TURBINE | — | NORMAL SHUTDOWN, COOLING SHUTDOWN |
| 5 | SHUTDOWN MODE OF HRSG | — | BANKING SHUTDOWN, COOLING SHUTDOWN |
| 6 | SHUTDOWN MODE OF CONDENSER | — | VACUUM RETENTION, VACUUM BREAK |

F I G. 6

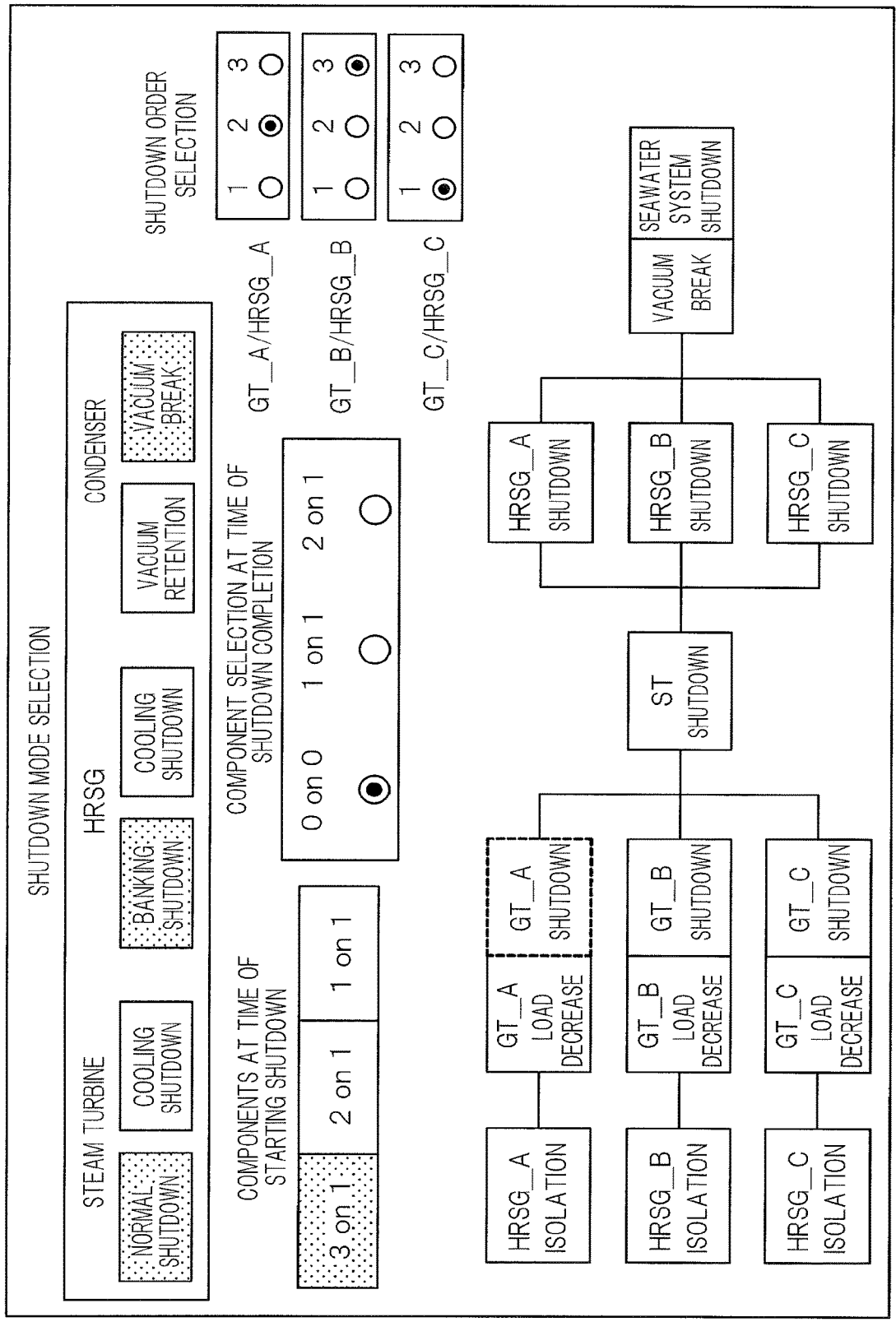
F I G. 10

US 10,809,684 B2

PLANT OPERATION APPARATUS, PLANT OPERATION METHOD, AND PLANT OPERATION PROGRAM

CROSS REFERENCE TO RELATED APPLICATIONS

This application is based upon and claims the benefit of priority from the prior Japanese Patent Application No. 2015-104572, filed on May 22, 2015, the entire contents of which are incorporated herein by reference.

FIELD

Embodiments relate to a plant operation apparatus, a plant operation method, and a plant operation program.

BACKGROUND

Conventionally, a multi-shaft combined-cycle power plant including a plurality of gas turbines, gas turbine generators and exhaust heat recovery boilers, and one steam turbine and one steam turbine generator has been known. As compared to a single-shaft combined-cycle power plant including a gas turbine, a gas turbine generator, an exhaust heat recovery boiler, a steam turbine, and a steam turbine generator, the multi-shaft combined-cycle power plant can install a large steam turbine. Therefore, there is an advantage in the multi-shaft combined-cycle power plant in that the efficiency of the steam turbine can be improved and the efficiency at the time of rated load can be improved.

Meanwhile, in the multi-shaft combined-cycle power plant, it is difficult to increase or decrease outputs of all the gas turbine generators and an output of the steam turbine generator equally and in balance, in order to achieve a target load instructed by an energy supply control center. Therefore, in the multi-shaft combined-cycle power plant, the outputs of the generators need to be increased or decreased sequentially by activating or shutting down the respective gas turbines sequentially. In a process of activating or shutting down the respective gas turbines sequentially, a vapor content to be supplied to the steam turbine changes largely due to a change in the number of operated gas turbines, and thus the output (load) of the stream turbine generator largely changes.

Accordingly, in the multi-shaft combined-cycle power plant, an operation taking into consideration the sequence of activating or shutting down the gas turbines has been demanded in order to achieve the target load. However, in the conventional multi-shaft combined-cycle power plant, there has been a problem that the operation taking into consideration the sequence of activating or shutting down the gas turbines cannot be performed easily.

BRIEF DESCRIPTION OF THE DRAWINGS

FIG. 6 is a diagram of an attribute set by the plant operation method according to the first embodiment;
FIG. 10 is a diagram of a shutdown progress screen displayed by the plant operation method according to the first embodiment.

DETAILED DESCRIPTION

A plant operation apparatus according to an embodiment operates a multi-shaft combined-cycle power plant including at least a plurality of gas turbines as a plurality of devices to be operated. The plant operation apparatus comprises a display unit and an interactive processing unit. The interactive processing unit can display on the display unit an activation setting screen on which activation sequence in an activation operation of the gas turbines and number of gas turbines to be in an operating state after the activation operation can be selected, and/or a shutdown setting screen on which shutdown sequence in a shutdown operation of the gas turbines and number of gas turbines to be in an operating state after the shutdown operation can be selected.

Exemplary embodiments of the present invention will be explained below with reference to the accompanying drawings. The present invention is not limited to the embodiments.

First Embodiment

Figure 1:
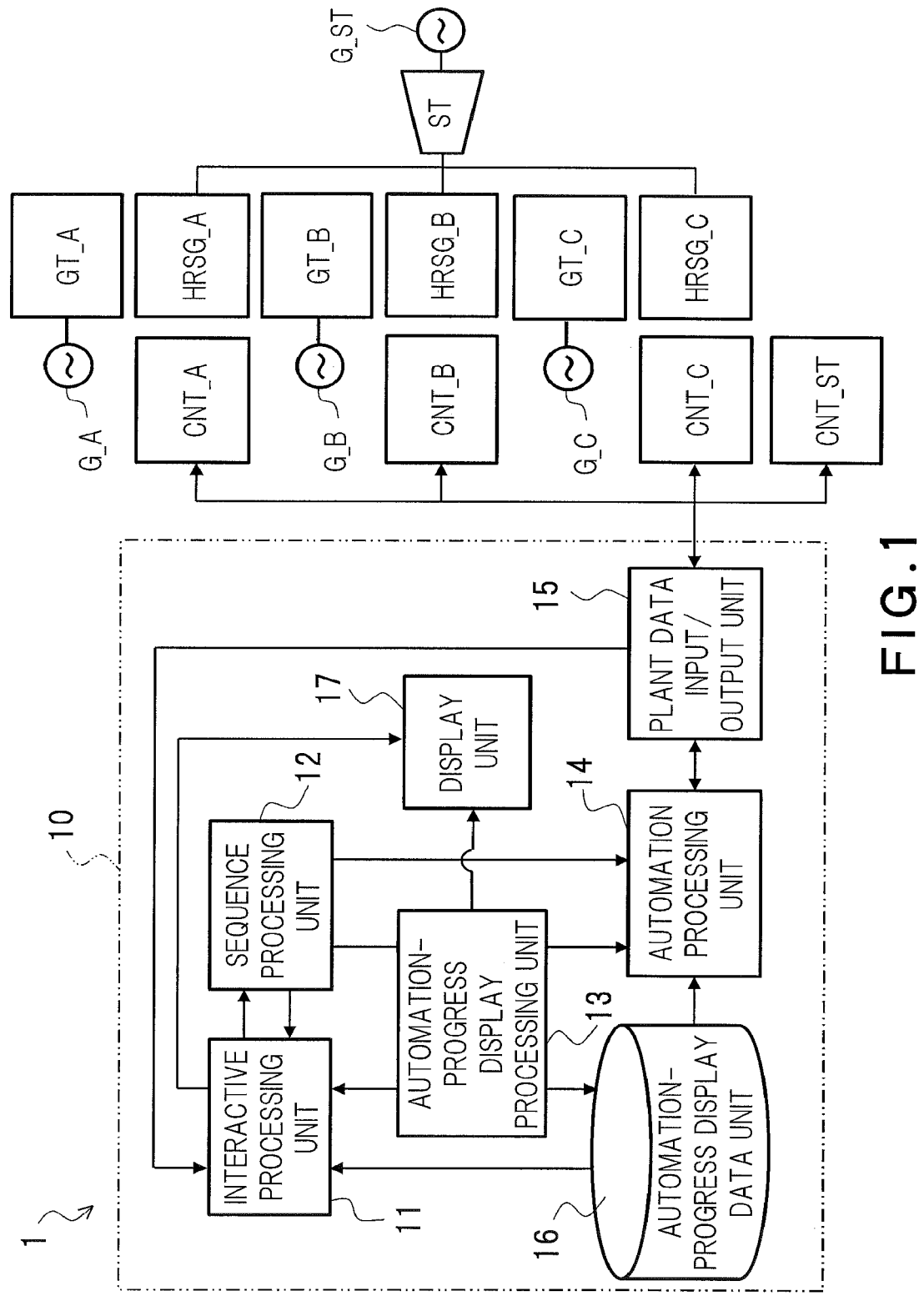
FIG. 1 is a block diagram of a multi-shaft combined-cycle power plant 1 according to a first embodiment.

As a first embodiment, an embodiment for simplifying a semi-automatic operation of a multi-shaft combined-cycle power plant is explained first. FIG. 1 is a block diagram of a multi-shaft combined-cycle power plant 1 according to the first embodiment.

As shown in FIG. 1, the multi-shaft combined-cycle power plant 1 includes a plant operation apparatus 10, three gas turbines GT_A to GT_C, exhaust heat recovery boilers HRSG_A to HRSG_C of the respective gas turbines GT_A to GT_C, gas turbine generators G_A to G_C of the respective gas turbines GT_A to GT_C, and controllers CNT_A to CNT_C of the respective gas turbines GT_A to GT_C. The multi-shaft combined-cycle power plant 1 also includes one steam turbine ST, a steam turbine generator G_ST, and a controller CNT_ST of the steam turbine ST. The controllers CNT_A to CNT_C can control not only the corresponding gas turbines GT_A to GT_C but also the exhaust heat recovery boilers HRSG_A to HRSG_C and the gas turbine generators G_A to G_C corresponding to the gas turbines GT_A to GT_C. These gas turbines GT_A to GT_C, the exhaust heat recovery boilers HRSG_A to HRSG_C, the gas turbine generators G_A to G_C, the steam turbine ST, and the steam turbine generator G_ST are devices to be operated by the plant operation apparatus 10, respectively. The number of gas turbines, exhaust heat recovery boilers, and gas turbine generators are not limited to three, so long as these are provided in plural. The steam turbine and the steam turbine generator can be provided in plural.

The plant operation apparatus 10 operates the respective devices to be operated of the multi-shaft combined-cycle power plant 1, thereby operating the multi-shaft combined-cycle power plant 1. As a specific configuration for operating the multi-shaft combined-cycle power plant 1, the plant operation apparatus 10 includes a plurality of constituent units 11 to 17 shown in FIG. 1. Specifically, the plant operation apparatus 10 includes an interactive processing unit 11, a sequence processing unit 12, an automation-progress display processing unit 13 as a display processing unit, and an automation processing unit 14. The plant operation apparatus 10 further includes a plant data input/output unit 15, an automation-progress display data unit 16, and a display unit 17.

The plant operation apparatus 10 can be configured by a computer system. Specifically, the respective constituent units 11 to 15 of the plant operation apparatus 10 can be realized by an arithmetic processing unit (a computer) such as a CPU or an MPU, a memory such as a ROM having a program or data to be used for processing of the arithmetic processing unit stored therein, and a memory such as a RAM to be used for temporarily saving therein a processing result of the arithmetic processing unit.

(Interactive Processing Unit 11)

The interactive processing unit 11 selectively displays an activation setting screen and a shutdown setting screen on the display unit 17. The interactive processing unit 11 can be a computer and a user interface that request a user to input data via a display and perform an interactive process (a conversational process) for performing a process corresponding to the data input of the user. The activation setting screen is a screen (an operation screen) on which the user can select an activation sequence of the gas turbines GT_A to GT_C in the activation operation of the gas turbines GT_A to GT_C (hereinafter, also "GT activation sequence"), and the number of gas turbines GT_A to GT_C to be in an operating state (a running state) after the activation operation (hereinafter, also "number of running gas turbines GT after activation"). The shutdown setting screen is a screen (an operation screen) on which the user can select a shutdown sequence of the gas turbines GT_A to GT_C in a shutdown operation of the gas turbines GT_A to GT_C (hereinafter, also "GT shutdown sequence"), and the number of gas turbines GT_A to GT_C to be in an operating state after the shutdown operation (hereinafter, also "number of running gas turbines GT after shutdown"). Display examples of the activation setting screen and the shutdown setting screen are described later.

Figure 2:
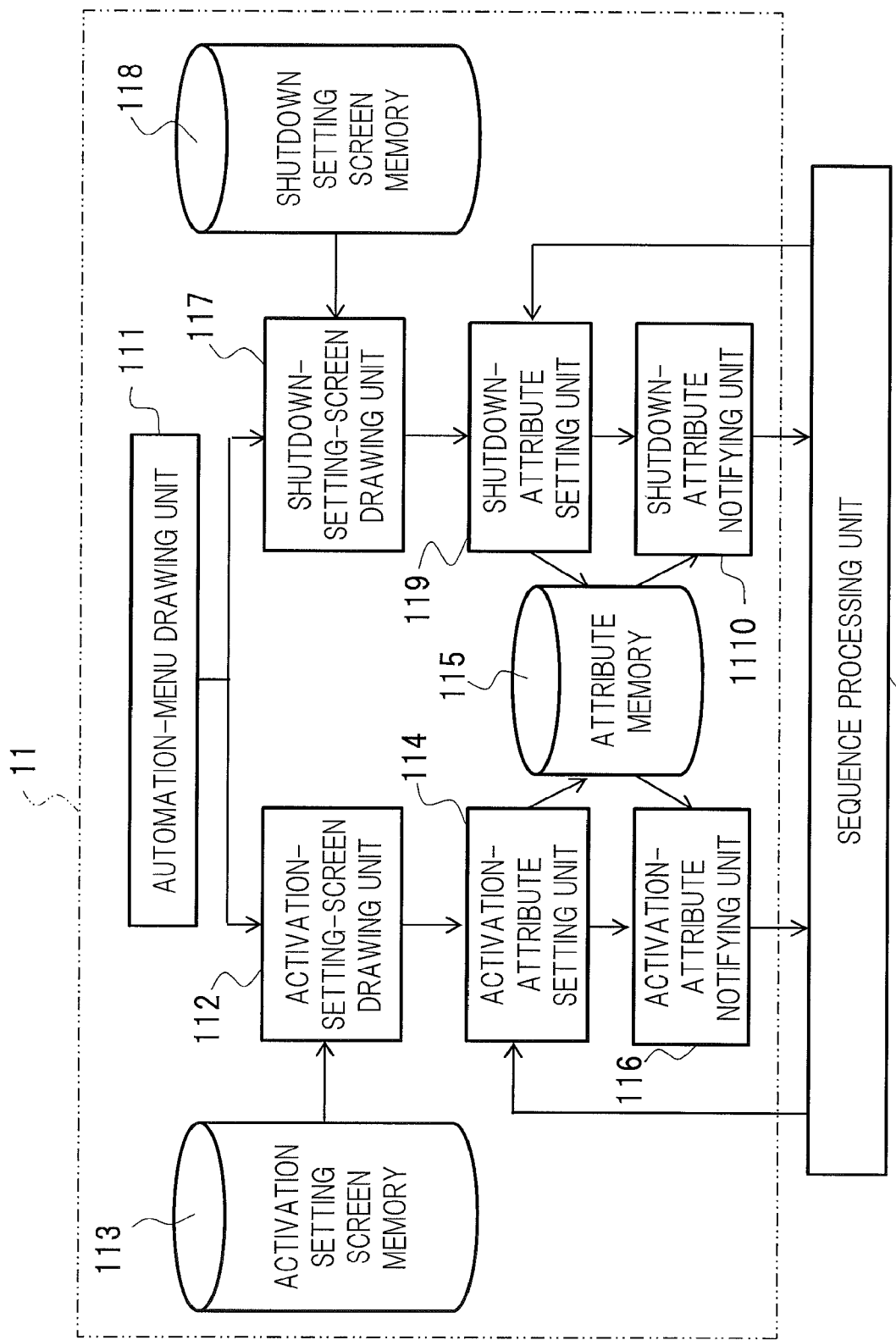
FIG. 2 is a block diagram showing an interactive processing unit 11 in a plant operation apparatus 10 of the multi-shaft combined-cycle power plant 1 in FIG. 1.

FIG. 2 is a block diagram showing the interactive processing unit 11 in the plant operation apparatus 10 of the multi-shaft combined-cycle power plant 1 in FIG. 1. As a specific configuration for displaying the activation setting screen and the shutdown setting screen, the interactive processing unit 11 includes a plurality of constituent units 111 to 1110 shown in FIG. 2. Specifically, the interactive processing unit 11 includes an automation-menu drawing unit 111, an activation-setting-screen drawing unit 112, an activation setting screen memory 113, an activation-attribute setting unit 114, an attribute memory 115, and an activation-attribute notifying unit 116. The interactive processing unit 11 also includes a shutdown-setting-screen drawing unit 117, a shutdown setting screen memory 118, a shutdown-attribute setting unit 119, and a shutdown-attribute notifying unit 1110.

The automation-menu drawing unit 111 displays a menu screen for displaying the activation setting screen and the shutdown setting screen. A specific mode of the menu screen is not particularly limited, and for example, can be an upper layer screen with respect to the activation setting screen and the shutdown setting screen, of a hierarchical menu screen. The menu screen can be an initial screen of the plant operation apparatus 10.

The activation-setting-screen drawing unit 112 displays the activation setting screen. The activation setting screen memory 113 stores therein activation setting screen information required for displaying the activation setting screen. The activation-setting-screen drawing unit 112 reads the activation setting screen information from the activation setting screen memory 113, and outputs the activation setting screen information to the display unit 17 (see FIG. 1), thereby displaying the activation setting screen.

The activation-attribute setting unit 114 records the GT activation sequence and the number of running gas turbines GT after activation selected on the activation setting screen as attributes (hereinafter, "activation attributes") in the attribute memory 115.

The activation-attribute notifying unit 116 reads the activation attributes stored in the attribute memory 115 and notifies (outputs) the activation attributes to the sequence processing unit 12.

The shutdown-setting-screen drawing unit 117 displays the shutdown setting screen. The shutdown setting screen memory 118 stores therein the shutdown setting screen information required for displaying the shutdown setting screen. The shutdown-setting-screen drawing unit 117 reads the shutdown setting screen information from the shutdown setting screen memory 118, and outputs the shutdown setting screen information to the display unit 17, thereby displaying the shutdown setting screen.

The shutdown-attribute setting unit 119 records the GT shutdown sequence and the number of running gas turbines GT after shutdown selected on the shutdown setting screen as attributes (hereinafter, "shutdown attributes") in the attribute memory 115.

The shutdown-attribute notifying unit 1110 reads the shutdown attributes stored in the attribute memory 115 and notifies (outputs) the shutdown attributes to the sequence processing unit 12.

To achieve a target load, in the activation operation of the gas turbines GT_A to GT_C, it is required to specify not only the GT activation sequence but also operation conditions (operation contents) of the gas turbines GT_A to GT_C. It is also required to specify the activation sequence of the device to be operated (for example, the exhaust heat recovery boilers HRSG_A to HRSG_C) other than the gas turbines GT_A to GT_C in the GT activation sequence, and the operation conditions of the device to be operated other than the gas turbines GT_A to GT_C. Similarly, in the shutdown operation of the gas turbines GT_A to GT_C, it is required to specify not only the GT shutdown sequence but also the operation conditions (operation contents) of the gas turbines GT_A to GT_C. It is also required to specify the shutdown sequence of the device to be operated (for example, the exhaust heat recovery boilers HRSG_A to HRSG_C) other than the gas turbines GT_A to GT_C in the GT shutdown sequence, and the operation conditions of the device to be operated other than the gas turbines GT_A to GT_C. If all items to be specified need to be specified by an input operation of the user, not only the operation load of the user becomes excessive, but also a high level of skill is required for the user to perform the correct input operation.

On the other hand, according to the first embodiment, because the main menu selection of the activation operation is complete, by selecting the GT activation sequence and the number of running gas turbines GT after activation on the activation setting screen, the input operation in the activation operation can be simplified. Further, according to the first embodiment, because the main menu selection of the shutdown operation is complete, by selecting the GT shutdown sequence and the number of running gas turbines GT after shutdown on the shutdown setting screen, the input operation in the shutdown operation can be simplified.

(Sequence Processing Unit 12)

The sequence processing unit 12 generates activation sequence information according to a selection result (an input operation result) on the activation setting screen. The activation sequence information is information in which activation elements of the respective devices to be operated required for the activation operation of the gas turbines GT_A to GT_C are arranged in order, according to the activation sequence and the number of running gas turbines GT after activation selected on the activation setting screen. Further, the activation elements are operation items and operation conditions of the respective devices to be operated, required for the activation operation of the gas turbines GT_A to GT_C. The devices to be operated required for the activation operation include not only the gas turbines GT_A to GT_C, but also the devices to be operated other than the gas turbines GT_A to GT_C such as the exhaust heat recovery boilers HRSG_A to HRSG_C. The operation items can be information indicating the device to be operated or a part of the device (for example, a name and an identification number). The operation condition can be information indicating a specific operation content of the operation item. For example, the activation element can be "GT_A activation" indicating an operation condition "activation" for an operation item "GT_A" (see FIG. 7). Other than this element, for example, the activation element can be "HRSG_A admission" indicating an operation condition "admission" for an operation item "HRSG_A".

The sequence processing unit 12 also generates shutdown sequence information corresponding to the selection result on the shutdown setting screen. The shutdown sequence information is information in which shutdown elements of the respective devices to be operated required for the shutdown operation of the gas turbines GT_A to GT_C are arranged in order, according to the shutdown sequence and the number of running gas turbines GT after shutdown selected on the shutdown setting screen. Further, the shutdown elements are operation items and operation conditions of the respective devices to be operated, required for the shutdown operation of the gas turbines GT_A to GT_C. The devices to be operated required for the shutdown operation include not only the gas turbines GT_A to GT_C, but also the devices to be operated other than the gas turbines GT_A to GT_C such as the exhaust heat recovery boilers HRSG_A to HRSG_C. For example, the shutdown element can be "GT_A shutdown" indicating an operation condition "shutdown" for the operation item "GT_A" (see FIG. 10). Other than this element, for example, the shutdown element can be "HRSG_A shutdown" indicating the operation condition "shutdown" for the operation item "HRSG_A".

Figure 3:
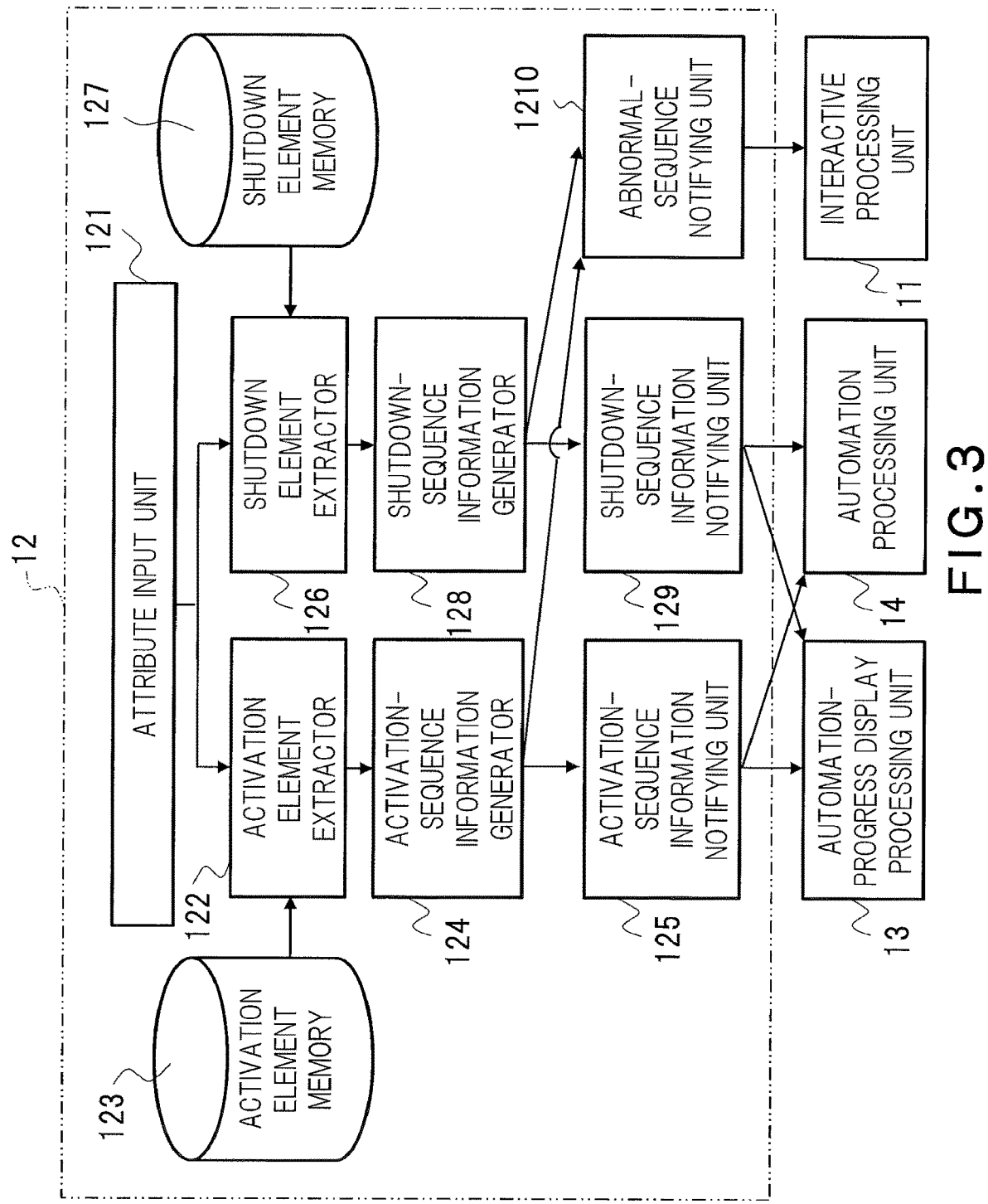
FIG. 3 is a block diagram showing a sequence processing unit 12 in the plant operation apparatus 10 of the multi-shaft combined-cycle power plant 1 in FIG. 1.

FIG. 3 is a block diagram showing the sequence processing unit 12 in the plant operation apparatus 10 of the multi-shaft combined-cycle power plant 1 in FIG. 1. As a specific configuration for generating the activation sequence information and the shutdown sequence information, the sequence processing unit 12 includes a plurality of constituent units 121 to 1210 shown in FIG. 3. Specifically, the sequence processing unit 12 includes an attribute input unit 121, an activation element extractor 122, an activation element memory 123, an activation-sequence information generator 124, and an activation-sequence information notifying unit 125. The sequence processing unit 12 also includes a shutdown element extractor 126, a shutdown element memory 127, a shutdown-sequence information generator 128, a shutdown-sequence information notifying unit 129, and an abnormal-sequence notifying unit 1210.

The attribute input unit 121 inputs the activation attribute and the shutdown attribute notified from the interactive processing unit 11.

The activation element extractor 122 extracts the activation element according to the activation attribute. The activation element memory 123 stores therein information of the activation element in a state associated with the information of the activation attribute. The activation element extractor 122 reads the activation element corresponding to the activation attribute input from the attribute input unit 121 from the activation element memory 123 to extract the activation element.

The activation-sequence information generator 124 arranges the activation elements extracted by the activation element extractor 122 according to the GT activation sequence to generate the activation sequence information.

The activation-sequence information notifying unit 125 notifies (outputs) the activation sequence information generated by the activation-sequence information generator 124 to the automation-progress display processing unit 13 and the automation processing unit 14.

The shutdown element extractor 126 extracts the shutdown element according to the shutdown attribute. The shutdown element memory 127 stores therein information of the shutdown element in a state associated with the information of the shutdown attribute. The shutdown element extractor 126 reads the shutdown element corresponding to the shutdown attribute input from the attribute input unit 121 from the shutdown element memory 127 to extract the shutdown element.

The shutdown-sequence information generator 128 arranges the shutdown elements extracted by the shutdown elements extractor 126 according to the GT shutdown sequence to generate the shutdown sequence information.

The shutdown-sequence information notifying unit 129 notifies the shutdown sequence information generated by the shutdown-sequence information generator 128 to the automation-progress display processing unit 13 and the automation processing unit 14.

The abnormal-sequence notifying unit 1210 detects abnormality in the GT activation sequence based on the activation sequence information, and notifies the interactive processing unit 11 of the detected abnormality in the GT activation sequence. The abnormal-sequence notifying unit 1210 also detects abnormality in the GT shutdown sequence based on the shutdown sequence information, and notifies the interactive processing unit 11 of the detected abnormality in the GT shutdown sequence.

In the activation operation of the gas turbines GT_A to GT_C, it is required to specify the sequence of the activation elements of the respective devices to be operated required for the activation operation. Similarly, in the shutdown operation of the gas turbines GT_A to GT_C, it is required to specify the sequence of the shutdown elements of the respective devices to be operated required for the shutdown operation. If specification of the sequence of the activation elements or the shutdown elements is left to user's determination, not only excessive load and a high level of skill are required for the user, but also an erroneous operation may occur due to erroneous determination.

On the other hand, according to the first embodiment, the sequence processing unit 12 can automatically obtain the accurate sequence of the activation elements as the activation sequence information. The sequence processing unit 12 can also automatically obtain the accurate sequence of the shutdown elements as the shutdown sequence information. The activation operation or the shutdown operation can be performed simply and accurately by using the activation sequence information and the shutdown sequence information for display and operation commands described later.

(Automation-Progress Display Processing Unit 13)

The automation-progress display processing unit 13 in FIG. 1 selectively displays an activation progress screen and a shutdown progress screen. The activation progress screen is a screen in which a plurality of display items indicating the activation elements of the respective devices to be operated are arranged based on the activation sequence information. The shutdown progress screen is a screen in which a plurality of display items indicating the shutdown elements of the respective devices to be operated are arranged based on the shutdown sequence information. In the first embodiment, the activation progress screen and the shutdown progress screen are operation screens on which a user can perform the input operation.

The automation-progress display processing unit 13 displays the activation progress screen in a display mode in which the sequence of the activation elements of the respective devices to be operated can be identified. The automation-progress display processing unit 13 also displays the shutdown progress screen in a display mode in which the sequence of the shutdown elements of the respective devices to be operated can be identified. The automation-progress display processing unit 13 records the data of the activation progress screen and the shutdown progress screen in the automation-progress display data unit 16.

Specifically, the automation-progress display processing unit 13 displays a specific display item of the display items on the activation progress screen in a different display mode from other display items based on the activation sequence information and the current plant operating state. The specific display item on the activation progress screen is the display item indicating, for example, the activation element to be operated next. The specific display item on the activation progress screen can be the display item indicating the activation element being currently operated. The automation-progress display processing unit 13 displays a specific display item of the display items on the shutdown progress screen in a different display mode from other display items based on the shutdown sequence information and the current plant operating state. The specific display item on the shutdown progress screen is the display item indicating, for example, the shutdown element to be operated next. The specific display item on the shutdown progress screen can be the display item indicating the shutdown element being currently operated.

More specifically, the automation-progress display processing unit 13 can perform blinking (flickering) display of the specific display item on the activation progress screen. The automation-progress display processing unit 13 can perform blinking display of the specific display item on the shutdown progress screen.

If the display items of the activation elements are displayed not based on the activation sequence information, even if the arrangement of the display items of the activation elements in a pattern fixed beforehand can be displayed, it is difficult for the user to identify the sequence of the activation elements according to the arrangement of the display items. On the other hand, in the first embodiment, the display items of the activation elements can be displayed in the display mode in which the user can identify the sequence of the activation elements based on the activation sequence information as well as the current plant operating state. For example, by performing blinking display of the display item of the activation element to be operated next, the user can follow transition of blinking display. The user can easily understand the sequence of the activation elements by following the transition of blinking display of the activation elements.

Furthermore, if the display items of the shutdown elements are displayed not based on the shutdown sequence information, even if the arrangement of the display items of the shutdown elements in a pattern fixed beforehand can be displayed, it is difficult for the user to identify the sequence of the shutdown elements according to the arrangement of the display items. On the other hand, in the first embodiment, the display items of the shutdown elements can be displayed in the display mode in which the user can identify the sequence of the shutdown elements based on the shutdown sequence information as well as the current plant operating state. For example, by performing blinking display of the display item of the shutdown element to be operated next, the user can follow the transition of blinking display. The user can easily understand the sequence of the shutdown elements by following the transition of blinking display of the shutdown elements.

(Automation Processing Unit 14)

The automation processing unit 14 outputs an operation command of the activation elements of the respective devices to be operated based on the activation sequence information and the current plant operating state. The automation processing unit 14 also outputs an operation command of the shutdown elements of the respective devices to be operated based on the shutdown sequence information and the current plant operating state. The automation processing unit 14 obtains the current plant operating state from the controllers CNT_A to CNT_C of the gas turbines GT_A to GT_C and the controller CNT_ST of the steam turbine ST via the plant data input/output unit 15 (an interface). The automation processing unit 14 also outputs the operation command to the controllers CNT_A to CNT_C of the gas turbines GT_A to GT_C via the plant data input/output unit 15. The automation processing unit 14 can output the operation command to the controller CNT_ST of the steam turbine ST.

In the first embodiment, the operation commands of the activation element and the shutdown element are operation commands in the semi-automatic operation of the multi-shaft combined-cycle power plant 1. Specifically, the automation-progress display processing unit 13 displays the display item indicating the activation element to be operated next in a selectable display mode. When the display item indicating the activation element to be operated next is selected, the automation processing unit 14 outputs an operation command of the activation element. The automation-progress display processing unit 13 also displays the display item indicating the shutdown element to be operated next in the selectable display mode. When the display item indicating the shutdown element to be operated next is selected, the automation processing unit 14 also outputs an operation command of the shutdown element.

In a single-shaft combined-cycle power plant, steam is supplied to one steam turbine from one gas turbine and one exhaust heat recovery boiler. On the other hand, in the multi-shaft combined-cycle power plant 1, steam is supplied to one steam turbine from a plurality of gas turbines and exhaust heat recovery boilers. Therefore, in the multi-shaft combined-cycle power plant 1, the vapor content to be supplied to the steam turbine ST, that is, an output of the steam turbine generator G_ST largely changes according to the number of operated gas turbines GT_A to GT_C. Accordingly, in the multi-shaft combined-cycle power plant 1, in order to achieve a target load, an operation command taking into consideration the activation and shutdown sequence of the respective gas turbines GT_A to GT_C is required. If the operation command taking into consideration the activation and shutdown sequence of the respective gas turbines GT_A to GT_C is left to user's determination, it is difficult for the user to output an appropriate operation command if the user does not have a considerable level of skill. On the other hand, according to the first embodiment, an appropriate operation command of the activation element can be output based on the activation sequence information. Specifically, blinking display of the display item of the activation element to be operated next is performed based on the activation sequence information and the plant operating state, and the operation command of the activation element is output after selecting the display item in blinking display, thereby enabling to operate the activation element to be operated next simply and reliably. Further, according to the first embodiment, an appropriate operation command of the shutdown element can be output based on the shutdown sequence information. Specifically, blinking display of the display item of the shutdown element to be operated next is performed based on the shutdown sequence information and the plant operating state, and the operation command of the shutdown element is output after selecting the display item in blinking display, thereby enabling to operate the shutdown element to be operated next simply and reliably.

As described above, according to the plant operation apparatus 10 of the first embodiment, the semi-automatic activation operation accompanied by a manual operation on the activation progress screen and the semi-automatic shutdown operation accompanied by a manual operation on the shutdown progress screen can be simplified.

(Activation Operation)

Figure 4:
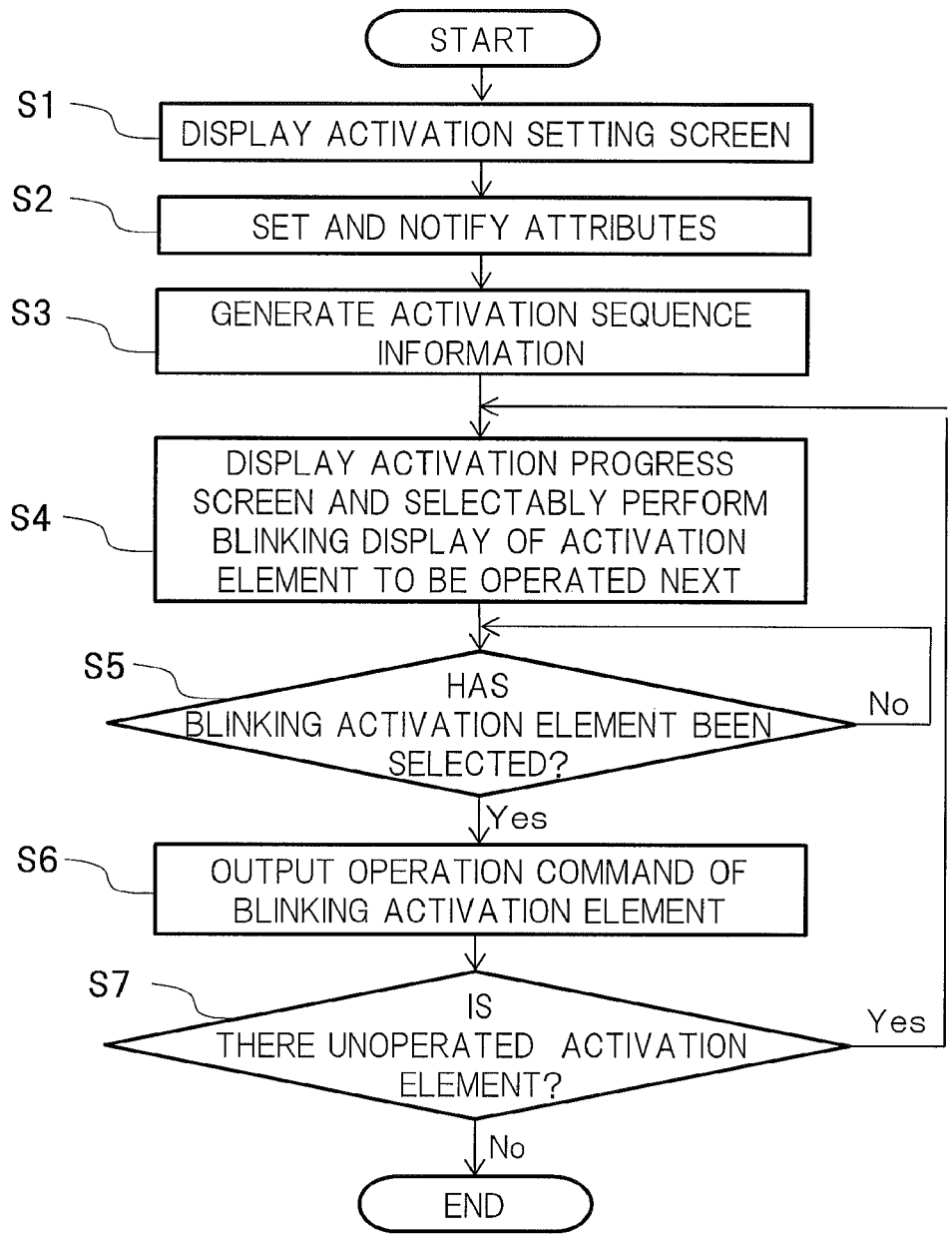
FIG. 4 is a flowchart of an activation operation in a plant operation method according to the first embodiment.
Figure 5:
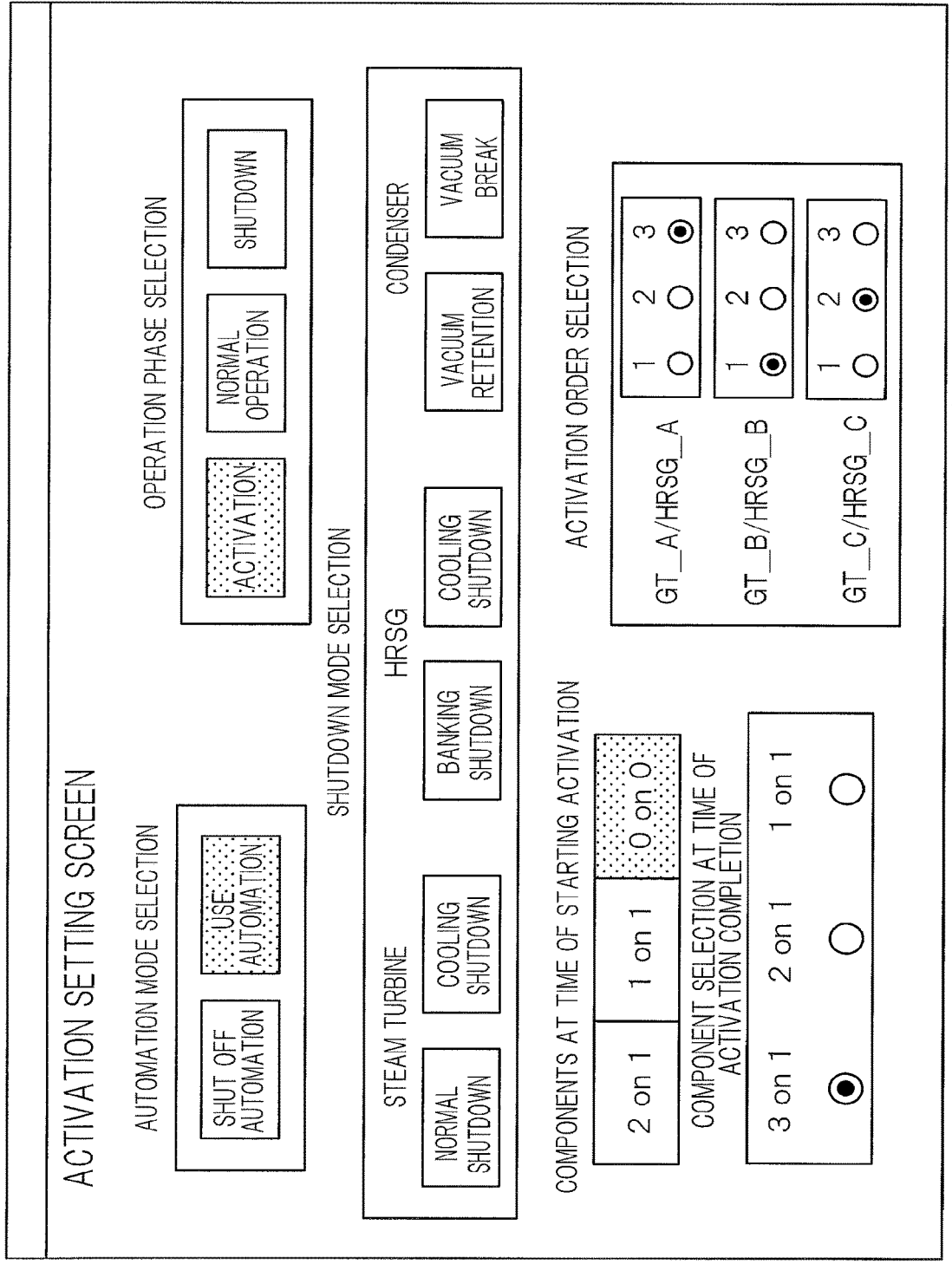
FIG. 5 is a diagram of an activation setting screen displayed by the plant operation method according to the first embodiment.
Figure 7:
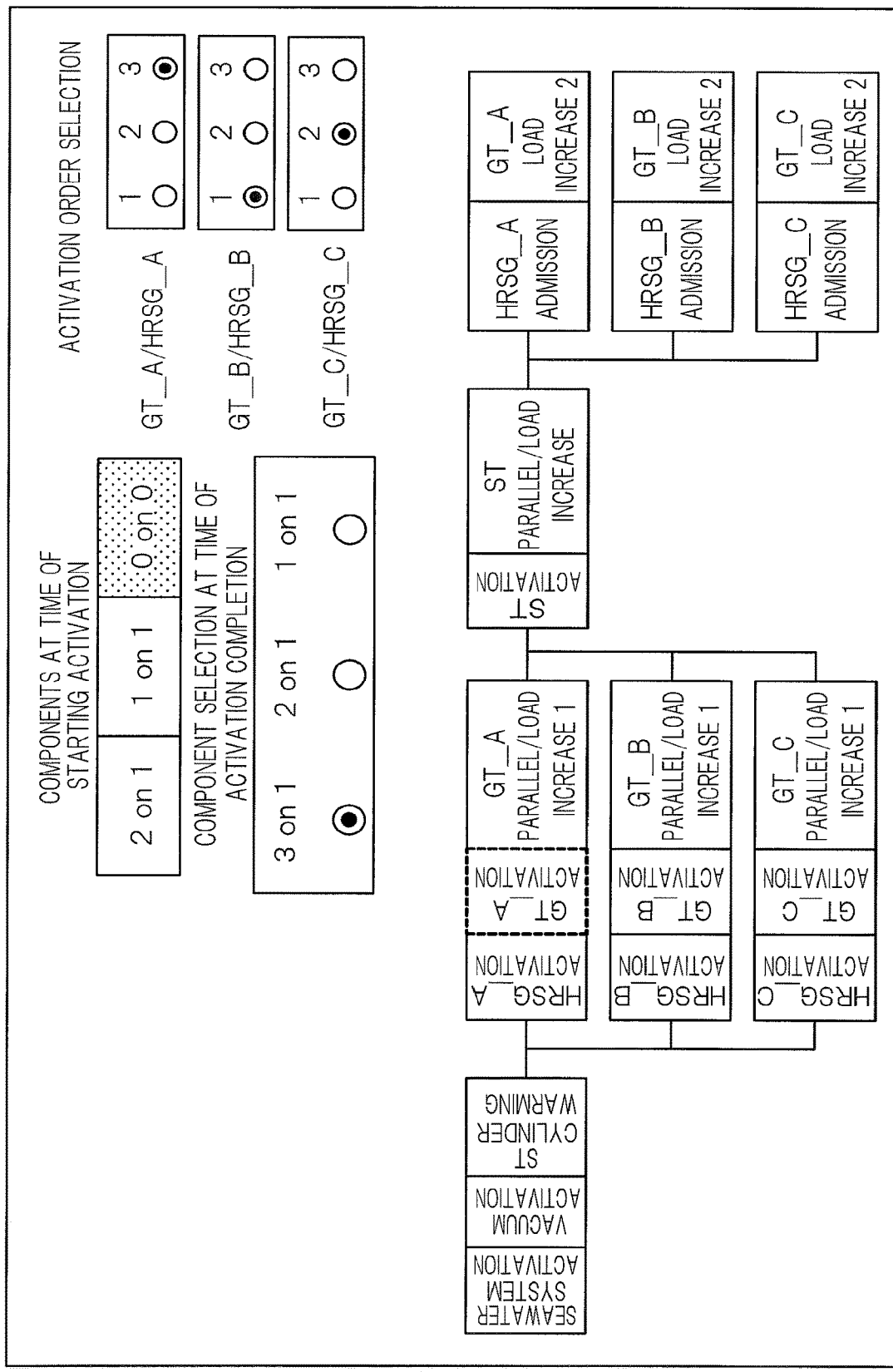
FIG. 7 is a diagram of an activation progress screen displayed by the plant operation method according to the first embodiment.

An activation operation of the gas turbines GT_A to GT_C in the plant operation method, to which the plant operation apparatus 10 in FIG. 1 is applied, is described with reference to FIGS. 4 to 7. The activation operation described below is an example of a procedure to be performed by the plant operation apparatus 10 (a computer) based on a plant operation program. FIG. 4 is a flowchart of the activation operation in the plant operation method according to the first embodiment. FIG. 5 is a diagram of an activation setting screen SC1 to be displayed by the plant operation method according to the first embodiment. FIG. 6 is a diagram of the attribute to be set by the plant operation method according to the first embodiment. FIG. 7 is a diagram of an activation progress screen SC2 to be displayed by the plant operation method according to the first embodiment.

(Display of Activation Setting Screen: S1)

As shown in FIG. 4, the interactive processing unit 11 first displays the activation setting screen SC1 shown in FIG. 5 by the activation-setting-screen drawing unit 112 (see FIG. 2) (Step S1). At this time, the interactive processing unit 11 reads the activation setting screen information in which types of the activation attributes ("activation", "number of gas turbines GT in operating state after activation operation", and "GT activation sequence") as shown in FIG. 6 are described from the activation setting screen memory 113. The interactive processing unit 11 displays the activation setting screen SC1 based on the read activation setting screen information.

The activation setting screen SC1 in FIG. 5 is a touch-panel operation screen. The activation setting screen SC1 in FIG. 5 includes component items at the time of starting activation, component selection items at the time of activation completion, and activation order selection items, as a plurality of setting items of the activation attributes. The activation setting screen SC1 in FIG. 5 includes automation mode selection items, operation phase selection items, and shutdown mode selection items as setting items other than the activation attributes. The touch panel has been described as an example of the activation setting screen SC1. However, the activation setting screen SC1 is not limited to the touch panel. Needless to mention, other modes can be used so long as the similar selection can be performed.

In the component items at the time of starting activation, a combination of the number of gas turbines GT_A to GT_C and the steam turbine ST ("2 on 1", "1 on 1", or "0 on 0" in FIG. 5) at the time of starting the activation operation (at present) can be selected. For example, "0 on 0" selected in FIG. 5 (shown by a dot pattern) is an option to select that zero (0) gas turbine and zero (0) steam turbine are activated at the time of starting the activation operation. Selection of the option in the component items at the time of starting activation can be performed automatically (by default) by the interactive processing unit 11 based on the current plant operating state. In the component selection items at the time of activation completion, a combination of the number of gas turbines GT_A to GT_C and the steam turbine ST ("3 on 1", "2 on 1", or "1 on 1" in FIG. 5) at the time of completion of the activation operation can be selected. For example, "3 on 0" selected in FIG. 5 (checked by a dot) is an option to select that three gas turbines and one steam turbine are activated at the time of completion of the activation operation. That is, in the component selection items at the time of activation completion, the number of running gas turbines GT after activation can be selected.

In the activation order selection items, the activation sequence of the gas turbines GT_A to GT_C and the exhaust heat recovery boilers HRSG_A to HRSG_C ("1", "2", or "3") can be selected.

In the automation mode selection items, a user can select to perform a semi-automatic operation (use automation) or a full manual operation (shut off automation) based on the operation command from the automation processing unit 14. In the operation phase selection items, the user can select operation phases ("activation", "normal operation", or "shutdown" in FIG. 5) of the multi-shaft combined-cycle power plant 1. In the shutdown mode selection items, the user can select a shutdown mode of the steam turbine ("normal shutdown" or "cooling shutdown" in FIG. 5), a shutdown mode of the exhaust heat recovery boiler ("banking shutdown" or "cooling shutdown" in FIG. 5), and a shutdown mode of a condenser ("vacuum retention" or "vacuum break" in FIG. 5). In the activation setting screen SC1, the shutdown mode selection can be invalidated.

As shown in FIG. 4, the activation-attribute setting unit 114 of the interactive processing unit 11 (see FIG. 2) records the activation attribute selected on the activation setting screen SC1 in the attribute memory 115, thereby setting the activation attribute (S2). The activation-attribute notifying unit 116 of the interactive processing unit 11 (see FIG. 2) notifies the sequence processing unit 12 of the activation attribute set in the attribute memory 115 (Step S2).

(Generation of Activation Sequence Information: S3)

As shown in FIG. 4, the sequence processing unit 12 (see FIG. 3) generates the activation sequence information based on the activation attribute notified from the activation-attribute notifying unit 116 (Step S3).

(Display of Activation Progress Screen: S4)

Next, as shown in FIG. 4, the automation-progress display processing unit 13 (see FIG. 1) displays the activation progress screen SC2 shown in FIG. 7 based on the activation sequence information and the current plant operating state (Step S4). At this time, the automation-progress display processing unit 13 selectably performs blinking display of the activation element ("GT_A activation" edged with a broken line in FIG. 7) to be operated next (Step S4).

As shown in FIG. 7, the activation progress screen SC2 includes setting items of the activation elements, of the activation setting screen SC1 in FIG. 5. The activation progress screen SC2 in FIG. 7 is a screen in which the GT activation sequence is set to GT_B, GT_C, and GT_A in this order on the activation setting screen SC1, and the number of running gas turbines GT after activation is set to 3 (3 on 1).

The activation progress screen SC2 in FIG. 7 includes a plurality of display items of the activation elements of the gas turbine GT_A (in other words, display blocks, icons, or break points). One display item displays one activation element. One display item can display a plurality of continuous activation elements collectively.

Specifically, the activation progress screen SC2 includes "HRSG_A activation" indicating activation of the exhaust heat recovery boiler HRSG_A, as the display item of the activation element of the gas turbine GT_A. Further, the activation progress screen SC2 includes "GT_A activation" indicating activation of the gas turbine GT_A, as the display item of the activation element of the gas turbine GT_A following activation of the exhaust heat recovery boiler HRSG_A. The activation progress screen SC2 also includes "GT_A parallel/load increase 1" indicating parallel operation and first load increase of the gas turbine GT_A, as the display item of the activation element of the gas turbine GT_A following activation of the gas turbine GT_A. The activation progress screen SC2 also includes "HRSG_A admission" indicating admission of the exhaust heat recovery boiler HRSG_A, as the display item of the activation element of the gas turbine GT_A following the parallel operation and the first load increase of the gas turbine GT_A. Further, the activation progress screen SC2 includes "GT_A load increase 2" indicating second load increase of the gas turbine GT_A, as the display item of the activation element of the gas turbine GT_A following the admission of the exhaust heat recovery boiler HRSG_A. The activation progress screen SC2 includes display items of the activation elements of the gas turbines GT_B and GT_C. However, because the contents of these display items are basically the same as the contents of the display items of the gas turbine GT_A, detailed descriptions thereof will be omitted.

The activation progress screen SC2 includes the plurality of display items of the activation elements of the steam turbine ST, other than the display items of the activation elements of the gas turbine GT_A to GT_C. Specifically, the activation progress screen SC2 includes "seawater system activation" indicating activation of the seawater system, as the activation element of the steam turbine ST. The activation progress screen SC2 also includes "vacuum increase" indicating a vacuum increase of the condenser, as the display item of activation element of the steam turbine ST following the activation of the seawater system. The activation progress screen SC2 also includes "ST cylinder warming" indicating warming of a cylinder of the steam turbine ST, as the display item of activation element of the steam turbine ST following the vacuum increase of the condenser. The activation progress screen SC2 also includes "ST activation" indicating activating of the steam turbine ST, as the display item of activation element of the steam turbine ST following warming of the cylinder of the steam turbine ST. Further, the activation progress screen SC2 includes "ST parallel/load increase" indicating parallel operation and load increase of the steam turbine ST, as the display item of activation element of the steam turbine ST following activation of the steam turbine ST.

If the activation progress screen simply indicates the arrangement of the display items of the activation elements, even if the arrangement of the display items of the activation elements are in accordance with the accurate operation sequence for each of the gas turbines GT_A to GT_C, it is difficult for a user to identify the accurate activation sequence of the entire plant 1. For example, in the activation progress screen SC2 in FIG. 7, the display items of the gas turbine GT_A are arranged in an upper stage (a first stage), the display items of the gas turbine GT_B are arranged in a middle stage (a second stage), and the display items of the gas turbine GT_C are arranged in a lower stage (a third stage). On the other hand, the GT activation sequence selected by the user is in order of the gas turbine GT_B, the gas turbine GT_C, and the gas turbine GT_A. Such a mismatch between the GT activation sequence (B→C→A) and the arrangement sequence of the display items (A→B→C) can cause a problem such that the accurate activation sequence is hard to understand. Further, in the activation progress screen SC2 in FIG. 7, the display item "HRSG_B admission" is included for the gas turbine GT_B to be activated first. However, in the actual activation operation, admission of the gas turbine GT_B to be activated first is not required. The display state of the display items deviated from the actual activation operation can cause a problem such that the accurate activation sequence becomes harder to understand.

On the other hand, according to the first embodiment, blinking display of the activation element of the gas turbines GT_A to GT_C to be operated next is performed. Therefore, according to the first embodiment, even if the arrangement sequence of the display items on the activation progress screen does not match with the actual activation operation sequence, the mismatch can be compensated by the blinking display truly reflecting the actual activation operation sequence. Consequently, because the user can identify the operation sequence of the activation elements of the gas turbines GT_A to GT_C accurately and easily, an accurate and simple semi-automatic activation operation can be realized with less stress. Further, in the activation progress screen SC2 in FIG. 7, the basic layout (an arrangement mode of the display items) is similar to the layout of the activation progress screen having been adopted conventionally. Therefore, the activation operation can be simplified with a low cost by a slight design change with respect to the existing technique.

Next, as shown in FIG. 4, the automation-progress display processing unit 13 determines whether the activation element in blinking display (hereinafter, also "blinking activation element") has been selected (Step S5).

(Output of Operation Command: S6)

When the blinking activation element is selected (Step S5: Yes), the automation processing unit 14 (see FIG. 1) outputs an operation command of the activation element corresponding to the selected blinking activation element to one of the controllers CNT_A to CNT_C of the device to be operated corresponding to the activation element, and the steam turbine ST (Step S6). When the blinking activation element is not selected (Step S5: No), the automation-progress display processing unit 13 repeats the determination of the presence of selection of the blinking activation element (Step S5).

The automation processing unit 14 then determines the presence of an unoperated activation element (Step S7). If there is no unoperated activation element (Step S7: No), the automation processing unit 14 finishes the process. On the other hand, if there is an unoperated activation element (Step S7: Yes), the automation-progress display processing unit 13 selectably performs blinking display of the activation element to be operated next (Step S4).

(Shutdown Operation)

Figure 8:
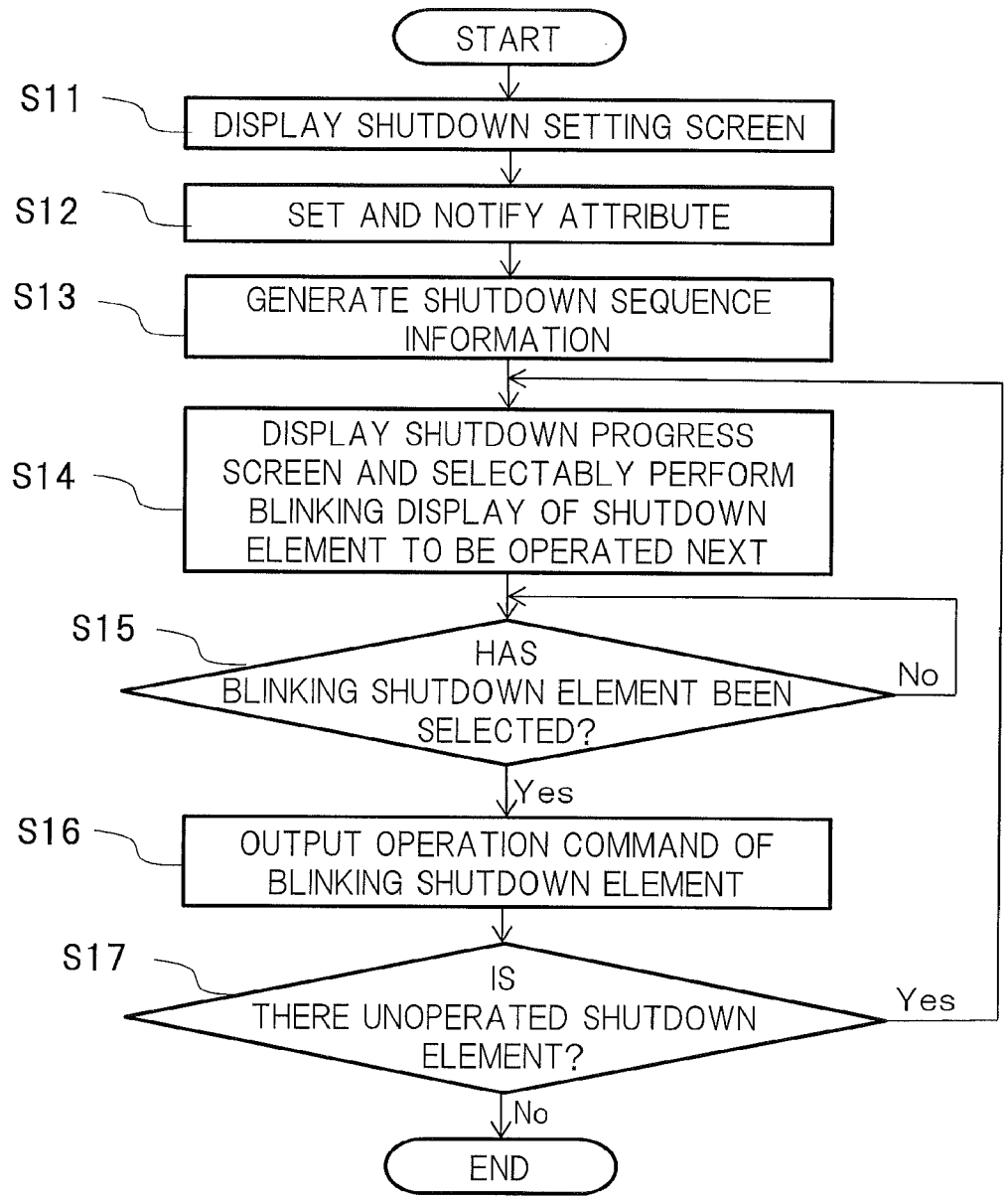
FIG. 8 is a flowchart of a shutdown operation in the plant operation method according to the first embodiment.
Figure 9:
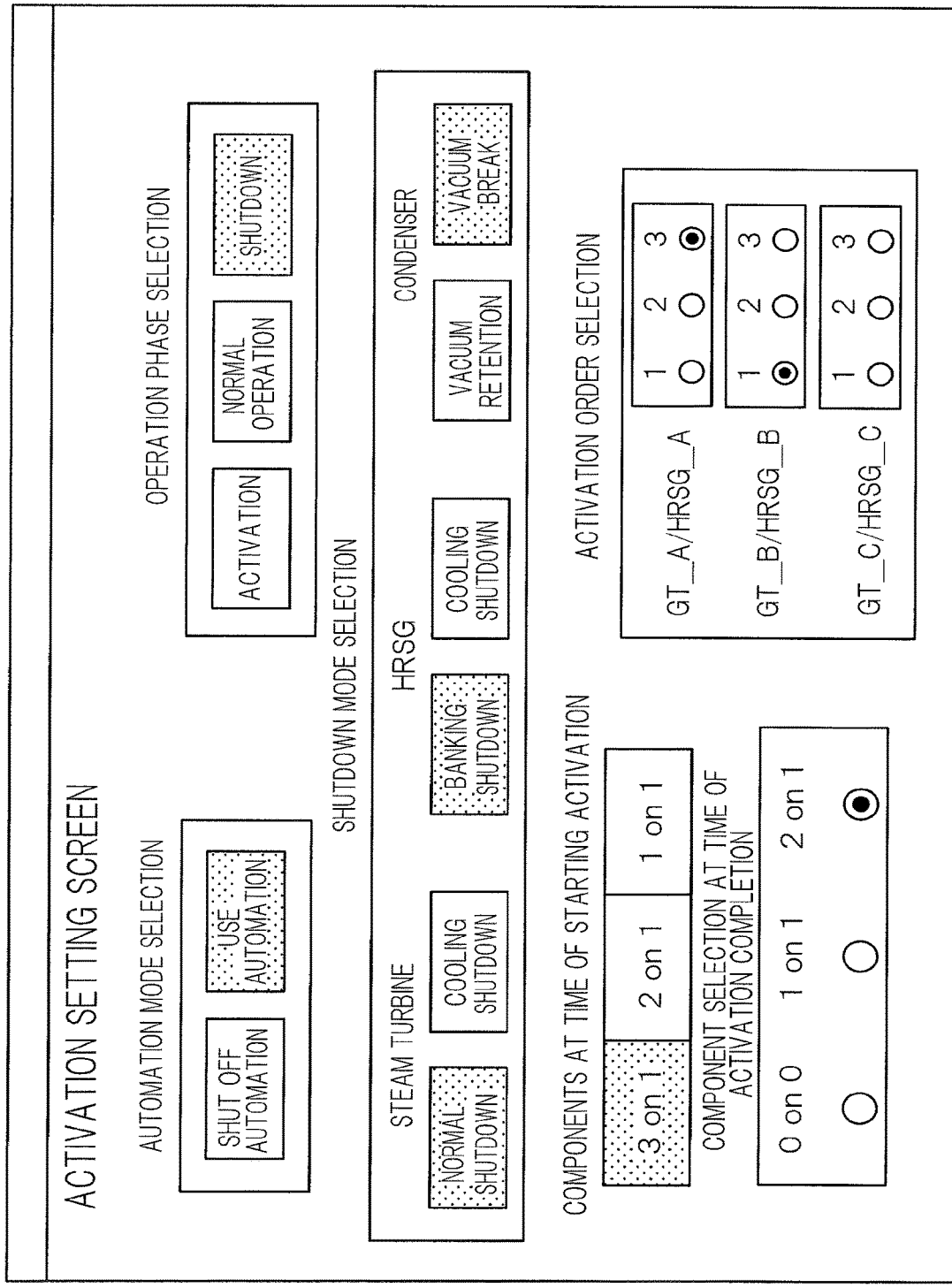
FIG. 9 is a diagram of a shutdown setting screen displayed by the plant operation method according to the first embodiment.

A shutdown operation of the gas turbines GT_A to GT_C in the plant operation method, to which the plant operation apparatus 10 in FIG. 1 is applied, is described with reference to FIGS. 8 to 10. The shutdown operation described below is an example of a procedure to be performed by the plant operation apparatus 10 (a computer) based on the plant operation program. FIG. 8 is a flowchart of the shutdown operation in the plant operation method according to the first embodiment. FIG. 9 is a diagram of a shutdown setting screen SC3 displayed by the plant operation method according to the first embodiment. FIG. 10 is a diagram of a shutdown progress screen SC4 displayed by the plant operation method according to the first embodiment.

(Display of Shutdown Setting Screen: S11)

As shown in FIG. 8, the interactive processing unit 11 first displays the shutdown setting screen SC3 shown in FIG. 9 by the shutdown-setting-screen drawing unit 117 (Step S11). At this time, the interactive processing unit 11 reads the shutdown setting screen information in which types of the shutdown attributes ("shutdown", "number of gas turbines GT in operating state after shutdown operation", "GT shutdown sequence", "normal shutdown/cooling shutdown", "banking shutdown/cooling shutdown", "vacuum retention/vacuum break") as shown in FIG. 6 are described, from the shutdown setting screen memory 118, and displays the shutdown setting screen SC3 based on the shutdown setting screen information.

The shutdown setting screen SC3 in FIG. 9 is a touch-panel operation screen. The shutdown setting screen SC3 in FIG. 9 includes component items at the time of starting shutdown, component selection items at the time of shutdown completion, and shutdown order selection items, as a plurality of setting items of shutdown attributes. The shutdown setting screen SC3 in FIG. 9 also includes automation mode selection items, operation phase selection items, and shutdown mode selection items as setting items other than the shutdown attributes. The touch panel has been described as an example of the shutdown setting screen SC3. However, the shutdown setting screen SC3 is not limited to the touch panel. Needless to mention, other modes can be used so long as the similar selection can be performed.

In the component items at the time of starting shutdown, a combination of the number of gas turbines GT_A to GT_C and the steam turbine ("3 on 1", "2 on 1", or "1 on 1" in FIG. 9) at the time of starting the shutdown operation (at present) can be selected. Selection of the option in the component items at the time of starting shutdown can be performed automatically (by default) by the interactive processing unit 11 based on the current plant operating state.

In the component selection items at the time of shutdown completion, a combination of the number of gas turbines GT_A to GT_C and the steam turbine ("0 on 0", "1 on 1", or "2 on 1" in FIG. 9) at the time of completion of the shutdown operation can be selected. For example, "2 on 1" is an option to select that two gas turbines and one steam turbine are running at the time of completion of the shutdown operation.

In the shutdown order selection items, the shutdown sequence of the gas turbines GT_A to GT_C and the exhaust heat recovery boilers HRSG_A to HRSG_C ("1", "2", or "3") can be selected.

The contents of the automation mode selection items, the operation phase selection items, and the shutdown mode selection items have been already described in the descriptions of the activation progress screen.

As shown in FIG. 8, the shutdown-attribute setting unit 119 of the interactive processing unit 11 (see FIG. 2) records the shutdown attribute selected on the shutdown setting screen SC3 in the attribute memory 115, thereby setting the shutdown attribute (S12). The shutdown-attribute notifying unit 1110 of the interactive processing unit 11 (see FIG. 2) notifies the sequence processing unit 12 of the shutdown attribute set in the attribute memory 115 (Step S12).

(Generation of Shutdown Sequence Information: S13)

As shown in FIG. 8, the sequence processing unit 12 (see FIG. 3) then generates the shutdown sequence information based on the shutdown attribute notified from the shutdown-attribute notifying unit 1110 (Step S13).

(Display of Shutdown Progress Screen: S14)

Next, as shown in FIG. 8, the automation-progress display processing unit 13 (see FIG. 1) displays the shutdown progress screen SC4 shown in FIG. 10 based on the shutdown sequence information and the current plant operating state (Step S14). At this time, the automation-progress display processing unit 13 selectably performs blinking display of the shutdown element to be operated next (Step S14).

As shown in FIG. 10, the shutdown progress screen SC4 includes setting items of the shutdown elements, of the shutdown setting screen SC3 in FIG. 9. The shutdown progress screen SC4 in FIG. 10 is a screen in which the GT shutdown sequence is set to GT_C, GT_A, and GT_B in this order on the shutdown setting screen SC3, and the number of running gas turbines GT after shutdown is set to zero (0) (0 on 0).

The shutdown progress screen SC4 in FIG. 10 includes a plurality of display items of the shutdown elements of the gas turbine GT_A. One display item can display one shutdown element, or a plurality of continuous shutdown elements collectively. Specifically, the shutdown progress screen SC4 includes "HRSG_A isolation" indicating isolation of the exhaust heat recovery boiler HRSG_A, as the display item of the shutdown element of the gas turbine GT_A. Further, the shutdown progress screen SC4 includes "GT_A load decrease" indicating a load decrease of the gas turbine GT_A, as the display item of the shutdown element of the gas turbine GT_A following the isolation of the exhaust heat recovery boiler HRSG_A. The shutdown progress screen SC4 also includes "HRSG_A shutdown" indicating shutdown of the exhaust heat recovery boiler HRSG_A, as the display item of the shutdown element of the gas turbine GT_A following the load decrease of the gas turbine GT_A. The shutdown progress screen SC4 also includes display items of the shutdown elements of the gas turbines GT_B and GT_C. However, because the contents of these display items are basically the same as the contents of the display items of the gas turbine GT_A, detailed descriptions thereof will be omitted.

The shutdown progress screen SC4 also includes a plurality of display items of the shutdown elements of the steam turbine ST, other than the display items of the shutdown elements of the gas turbines GT_A to GT_C. Specifically, the shutdown progress screen SC4 includes "ST shutdown" indicating shutdown of the steam turbine ST, as the shutdown element of the steam turbine ST. The shutdown progress screen SC4 also includes "vacuum break" indicating vacuum break of the condenser, as the display item of the shutdown element of the steam turbine ST following the shutdown of the steam turbine ST. The shutdown progress screen SC4 also includes "seawater system shutdown" indicating shutdown of the seawater system, as the display item of the shutdown element of the steam turbine ST following the vacuum break of the condenser.

Furthermore, in FIG. 10, "GT_A shutdown" is blinking-displayed as the display item of the shutdown element of the gas turbines GT_A to GT_C to be operated next.

If the shutdown progress screen simply indicates the arrangement of the display items of the shutdown elements, even if the arrangement of the display items of the shutdown elements are in accordance with the accurate operation sequence for each of the gas turbines GT_A to GT_C, it is difficult for a user to identify the accurate shutdown sequence of the entire plant 1. For example, in the shutdown progress screen SC4 in FIG. 10, the display items of the gas turbine GT_A are arranged in an upper stage, the display items of the gas turbine GT_B are arranged in a middle stage, and the display items of the gas turbine GT_C are arranged in a lower stage. On the other hand, the GT shutdown sequence selected by the user is in order of the gas turbine GT_C, the gas turbine GT_A, and the gas turbine GT_B. Such a mismatch between the GT shutdown sequence (C→A→B) and the arrangement sequence of the display items (A→B→C) can cause a problem such that the accurate shutdown sequence is hard to understand. Further, in the shutdown progress screen SC4 in FIG. 10, the display item "HRSG_B isolation" is included for the gas turbine GT_B to be shut down last. However, in the actual shutdown operation, isolation of the gas turbine GT_B to be shut down last is not required. The display state of the display items deviated from the actual shutdown operation can cause a problem such that the accurate shutdown sequence becomes harder to understand.

On the other hand, according to the first embodiment, blinking display of the shutdown element of the gas turbines GT_A to GT_C to be operated next is performed. Therefore, according to the first embodiment, even if the arrangement sequence of the display items on the shutdown progress screen does not match with the actual shutdown operation sequence, the mismatch can be compensated by the blinking display truly reflecting the actual shutdown operation sequence. Consequently, because the user can identify the operation sequence of the shutdown elements of the gas turbines GT_A to GT_C accurately and easily, an accurate and simple semi-automatic shutdown operation can be realized with less stress. Further, in the shutdown progress screen SC4 in FIG. 10, the basic layout (the arrangement mode of the display items) is similar to the layout of the shutdown progress screen having been adopted conventionally. Therefore, the shutdown operation can be simplified with a low cost by a slight design change with respect to the existing technique.

Next, as shown in FIG. 8, the automation-progress display processing unit 13 determines whether the shutdown element in blinking display (hereinafter, also "blinking shutdown element") has been selected (Step S15).

(Output of Operation Command: S16)

When the blinking shutdown element is selected (Step S15: Yes), the automation processing unit 14 outputs an operation command of the shutdown element corresponding to the selected blinking shutdown element to one of the controllers CNT_A to CNT_C of the device to be operated corresponding to the shutdown element, and the steam turbine ST (Step S16). When the blinking shutdown element is not selected (Step S15: No), the automation-progress display processing unit 13 repeats the determination of the presence of selection of the blinking shutdown element (Step S15).

The automation processing unit 14 then determines the presence of an unoperated shutdown element (Step S17). If there is no unoperated shutdown element (Step S17: No), the automation processing unit 14 finishes the process. On the other hand, if there is an unoperated shutdown element (Step S17: Yes), the automation-progress display processing unit 13 selectably performs blinking display of the shutdown element to be operated next (Step S14).

As described above, according to the first embodiment, because a burden and difficulty of the input operation in the activation operation and the shutdown operation can be reduced by displaying the activation setting screen and the shutdown setting screen, the operation of the multi-shaft combined-cycle power plant 1 can be simplified. Further, according to the first embodiment, because the accurate sequence of the activation elements and the shutdown elements can be displayed in an easily understandable manner for a user in the mode of the activation progress screen and the shutdown progress screen, by generating the activation sequence information and the shutdown sequence information, the operation can be further simplified. According to the first embodiment, the operation can be further simplified by performing blinking display of the activation/shutdown element to be operated next on the activation progress screen and the shutdown progress screen. According to the first embodiment, because the operation command according to the accurate operation sequence indicated by the activation sequence information and the shutdown sequence information can be selected, the operation can be further simplified.

The automation-progress display processing unit 13 can display a specific display item in a mode different from those of other display items according to a display method other than the blinking display. For example, the automation-progress display processing unit 13 can highlights a specific display item by edging or the like.

(Modification)

As a modification of the first embodiment, an example of simplifying a full automatic operation of the multi-shaft combined-cycle power plant is described next. In the explanations of the present modification, constituent elements corresponding to those of the multi-shaft combined-cycle power plant 1 in FIG. 1 are denoted by like reference characters and redundant explanations thereof will be omitted.

Figure 11:
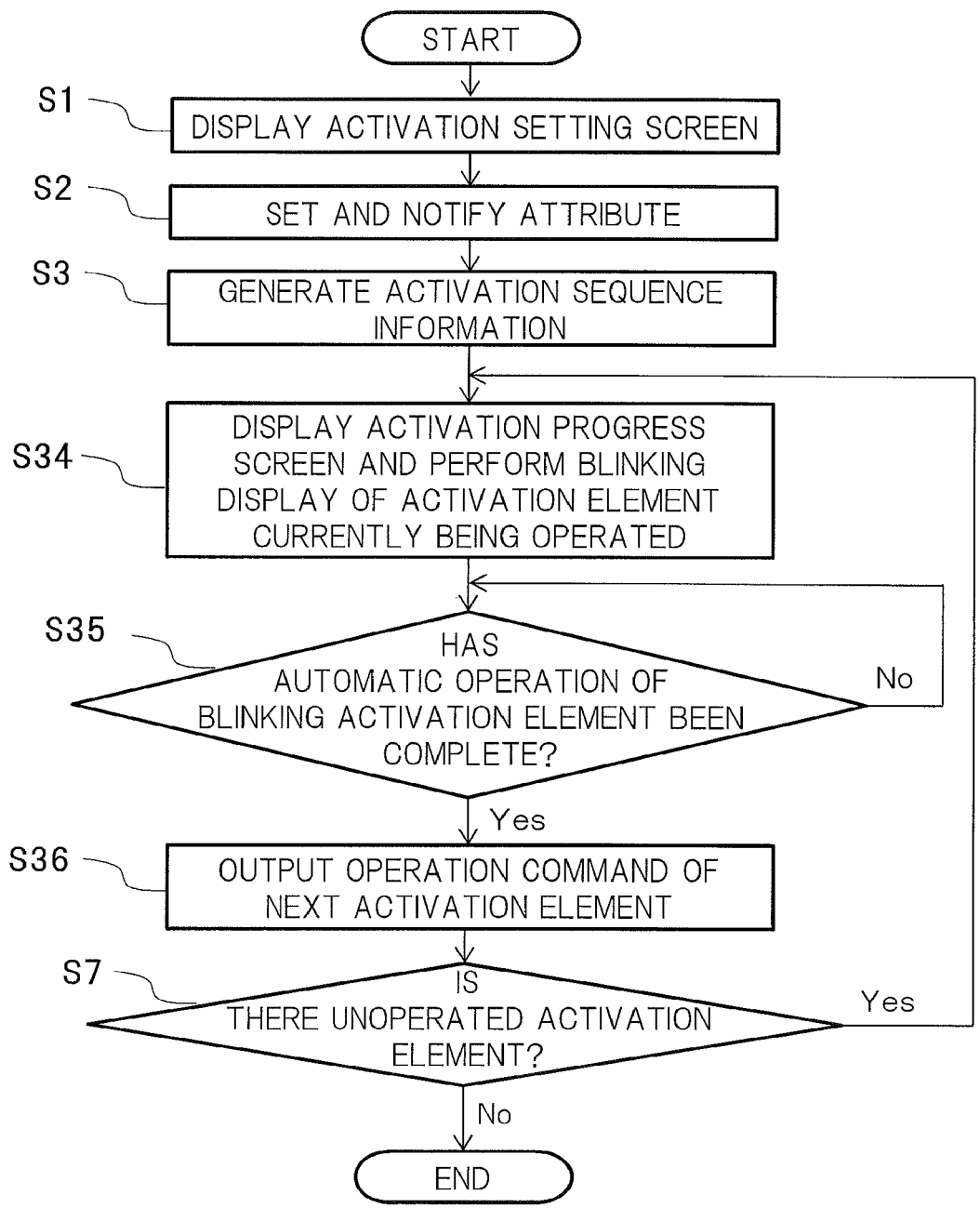
FIG. 11 is a flowchart of an activation operation in a plant operation method according to a modification of the first embodiment.

FIG. 11 is a flowchart of an activation operation in a plant operation method according to the modification of the first embodiment. The plant operation apparatus 10 according to the present modification is different from the plant operation apparatus 10 shown in FIG. 1, in motion contents of the automation-progress display processing unit 13 and the automation processing unit 14 in the activation operation.

Specifically, after generation of the activation sequence information (Step S3), the automation-progress display processing unit 13 performs blinking display of the activation element being currently operated, at the time of displaying the activation progress screen (Step S34). At this time, the automation-progress display processing unit 13 can detect the activation element being currently operated based on the activation sequence information and the current plant operating state.

The automation-progress display processing unit 13 then determines whether the automatic operation of the blinking activation element has been complete based on the current plant operating state (Step S35).

When the automatic operation of the blinking activation element has been complete (Step S35: Yes), the automation processing unit 14 outputs an operation command of the next activation element (Step S36). That is, the automation processing unit 14 performs a full-automatic activation operation without any manual operation on the activation progress screen. On the other hand, when the automatic operation of the blinking activation element has not been complete (Step S35: No), the automation-progress display processing unit 13 repeats the determination of the presence of completion of the automatic operation of the blinking activation element (Step S35).

In the case of the full-automatic activation operation, the user does not require an input operation basically, other than the input operation on the activation setting screen. Therefore, as compared to the case of the semi-automatic operation, the activation operation of the gas turbines GT_A to GT_C can be further simplified. The user can easily understand a progress status of the full-automatic activation operation by the blinking display of the activation element being currently operated on the activation progress screen. Consequently, a monitoring burden of the activation operation can be reduced.

Figure 12:
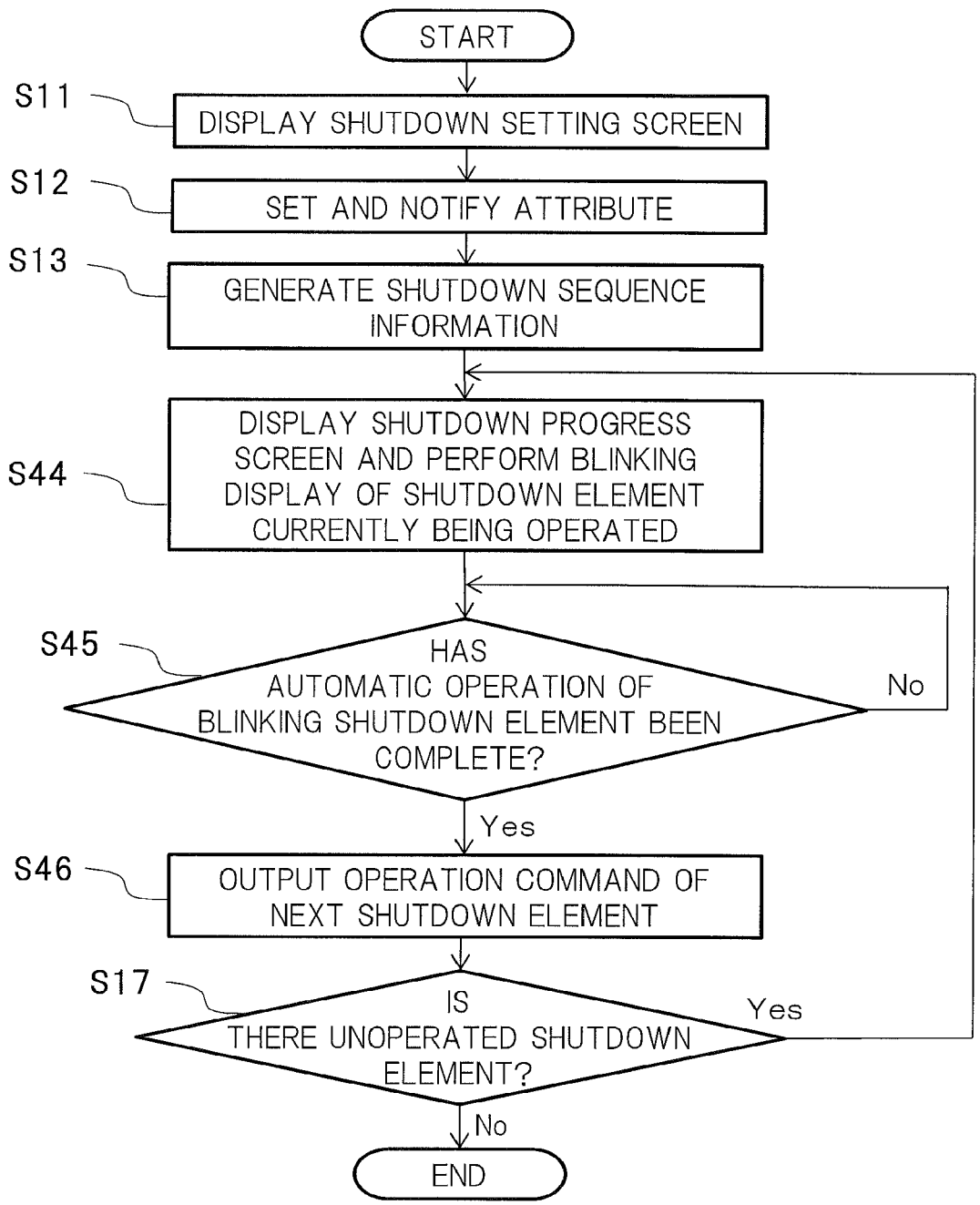
FIG. 12 is a flowchart of a shutdown operation in the plant operation method according to the modification of the first embodiment.

FIG. 12 is a flowchart of a shutdown operation in the plant operation method according to the modification of the first embodiment. The plant operation apparatus 10 according to the present modification is different from the plant operation apparatus 10 shown in FIG. 1, in the motion contents of the automation-progress display processing unit 13 and the automation processing unit 14 in the shutdown operation.

Specifically, after generation of the shutdown sequence information (Step S13), the automation-progress display processing unit 13 performs blinking display of the shutdown element being currently operated, at the time of displaying the shutdown progress screen (Step S44). At this time, the automation-progress display processing unit 13 can detect the shutdown element being currently operated based on the shutdown sequence information and the current plant operating state.

The automation-progress display processing unit 13 then determines whether the automatic operation of the blinking shutdown element has been complete based on the current plant operating state (Step S45).

When the automatic operation of the blinking shutdown element has been complete (Step S45: Yes), the automation processing unit 14 outputs an operation command of the next shutdown element (Step S46). That is, the automation processing unit 14 performs a full-automatic shutdown operation without any manual operation on the shutdown progress screen. On the other hand, when the automatic operation of the blinking shutdown element has not been complete (Step S45: No), the automation-progress display processing unit 13 repeats the determination of the presence of completion of the automatic operation of the blinking shutdown element (Step S45).

In the case of the full-automatic shutdown operation, a user does not require an input operation basically, other than the input operation on the shutdown setting screen. Therefore, as compared to the case of the semi-automatic operation, the shutdown operation of the gas turbines GT_A to GT_C can be further simplified. The user can easily understand a progress status of the full-automatic shutdown operation by the blinking display of the shutdown element being currently operated on the shutdown progress screen. Consequently, a monitoring burden of the shutdown operation can be reduced.

As described above, according to the present modification, the full automatic operation of the multi-shaft combined-cycle power plant 1 can be simplified, and the monitoring burden of the operational aspect can be reduced.

Second Embodiment

As a second embodiment, an embodiment of the plant operation apparatus in which visibility of the activation progress screen and the shutdown progress screen is improved is described. In the explanations of the second embodiment, constituent elements corresponding to those of the first embodiment are denoted by like reference characters and redundant explanations thereof will be omitted.

Figure 13:
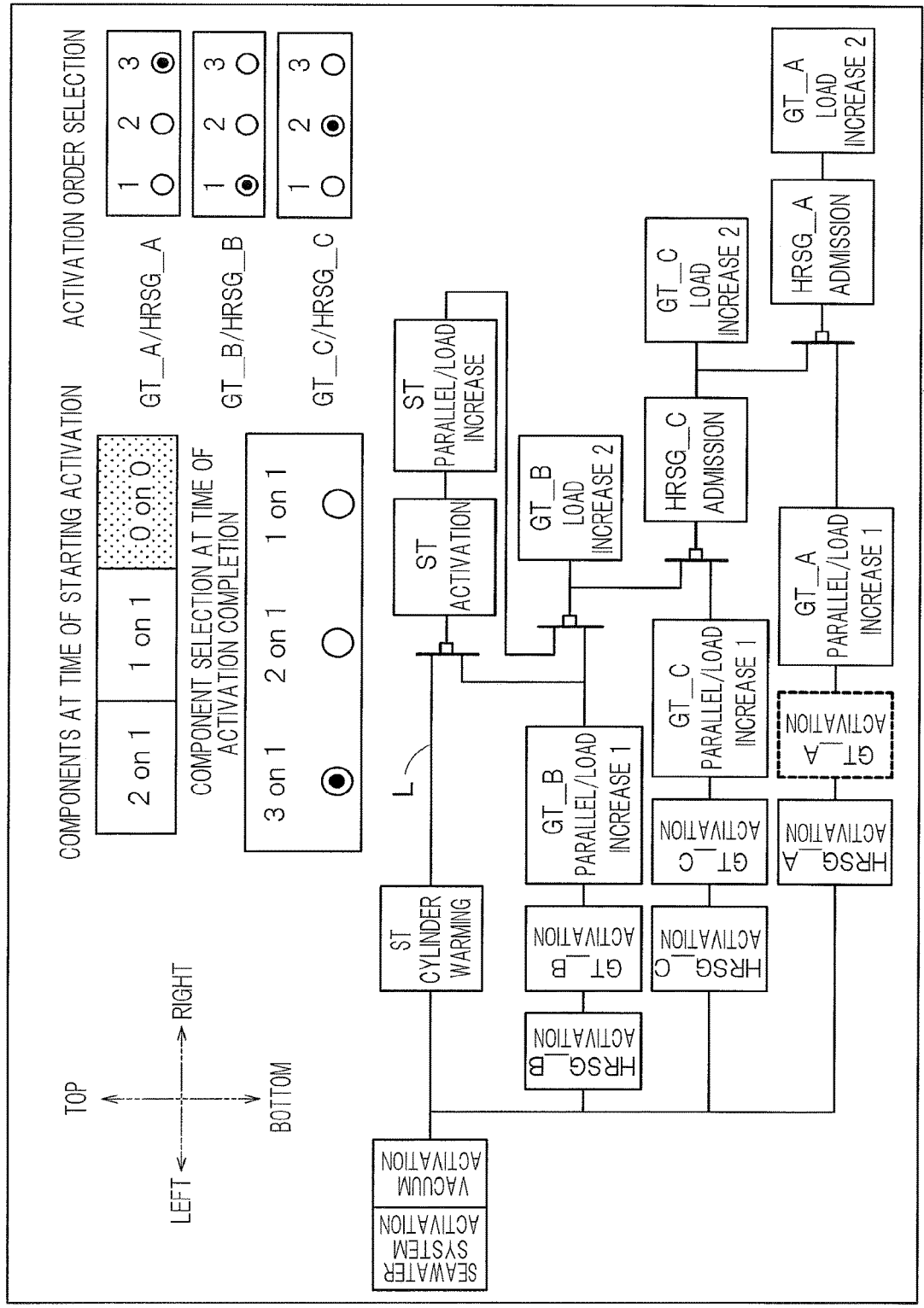
FIG. 13 is a diagram of an activation progress screen displayed by a plant operation method according to a second embodiment.

FIG. 13 is a diagram of the activation progress screen SC2 displayed by the plant operation method according to the second embodiment.

The plant operation apparatus 10 according to the second embodiment is different from the plant operation apparatus 10 according to the first embodiment, in a display mode of the activation progress screen SC2 by the automation-progress display processing unit 13.

Specifically, as shown in FIG. 13, in the activation progress screen SC2 of the second embodiment, the arrangement sequence of the display items of the activation elements is matched with the GT activation sequence selected on the activation setting screen SC1. In other words, the display items of the activation elements according to the second embodiment represent the temporal sequence of the activation elements truly and in an easily understandable manner. More specifically, the activation progress screen SC2 in FIG. 13 is a screen when the GT activation sequence is set to GT_B, GT_C, and GT_A in this order on the activation setting screen SC1. The arrangement sequence of the display items of the activation elements is GT_B, GT_C, and GT_A from top to bottom and from left to right, with respect to the GT activation sequence in order of GT_B, GT_C, and GT_A.

According to the activation progress screen SC2 in FIG. 13, the user can easily understand at a glance that the gas turbines GT_A to GT_C are activated in order of GT_B, GT_C, and GT_A.

In the activation progress screen SC2 in FIG. 13, a line L extends from a display item of an arbitrary activation element to a display item of the next activation element. Further, lines L extending from each of two activation elements in a previous step are combined and connected to an activation element in a subsequent step with a condition that the operation of the two activation elements in the previous step is complete.

According to the activation progress screen SC2 in FIG. 13, the user can visually recognize that a line L extending from, for example, "ST cylinder warming" and a line L extending from "GT_B parallel/load increase 1" are connected to "ST activation". Accordingly, the user can easily understand at a glance that the activation of the steam turbine ST is performed after completion of warming of the cylinder of the steam turbine ST and the parallel operation of the gas turbine GT_B and the first load increase. Other than this configuration, the user can easily understand that the steam turbine ST is activated after activation of the first exhaust heat recovery boiler HRSG_B and the first gas turbine GT_B, and thereafter, the second exhaust heat recovery boiler HRSG_C and the second gas turbine GT_C are activated. Further, the activation progress screen SC2 does not include a display item that is not used for the actual activation operation, such as admission of the exhaust heat recovery boiler HRSG_B of the gas turbine GT_B to be activated first, and thus it can be prevented that the user is confused.

Figure 14:
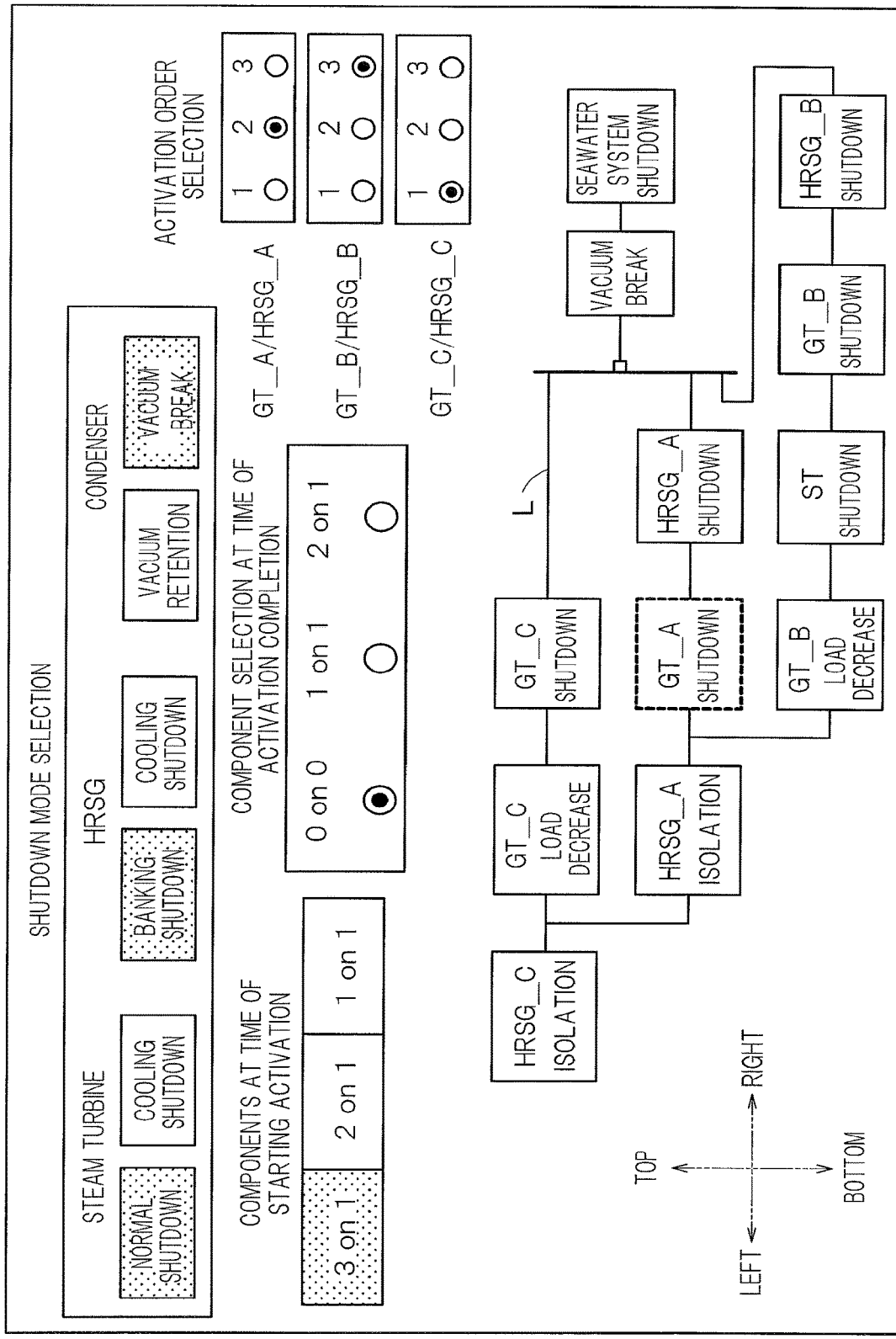
FIG. 14 is a diagram of a shutdown progress screen displayed by the plant operation method according to the second embodiment.

FIG. 14 is a diagram of the shutdown progress screen SC4 displayed by the plant operation method according to the second embodiment.

The plant operation apparatus 10 according to the second embodiment is different from the plant operation apparatus 10 according to the first embodiment, also in a display mode of the shutdown progress screen SC4 by the automation-progress display processing unit 13.

Specifically, as shown in FIG. 14, in the shutdown progress screen SC4 according to the second embodiment, the arrangement sequence of the display items of the shutdown elements is matched with the GT shutdown sequence selected on the shutdown setting screen SC3. In other words, the display items of the shutdown elements according to the second embodiment represent the temporal sequence of the shutdown elements truly and in an easily understandable manner. More specifically, the shutdown progress screen SC4 in FIG. 14 is a screen when the GT shutdown sequence is set to GT_C, GT_A, and GT_B in this order on the shutdown setting screen SC3. The arrangement sequence of the display items of the shutdown elements is GT_C, GT_A, and GT_B from top to bottom and from left to right, with respect to the GT shutdown sequence in order of GT_C, GT_A, and GT_B.

According to the shutdown progress screen SC4 in FIG. 14, the user can easily understand at a glance that the gas turbines GT_A to GT_C are shut down in order of GT_C, GT_A, and GT_B.

In the shutdown progress screen SC4 in FIG. 14, a line L extends from a display item of an arbitrary shutdown element to a display item of the next shutdown element. Further, lines L extending from each of two shutdown elements in a previous step are combined and connected to a shutdown element in a subsequent step with a precondition that the operation of the two shutdown elements in the previous step are complete.

According to the shutdown progress screen SC4 in FIG. 14, the user can visually recognize that a line L extending from, for example, "GT_C shutdown" and a line L extending from "HRSG_A shutdown" are connected to "vacuum break". Accordingly, the user can easily understand at a glance that the vacuum break of the condenser of the steam turbine ST occurs after completion of both the shutdown of the gas turbine GT_C and the shutdown of the exhaust heat recovery boiler HRSG_A. Further, the shutdown progress screen SC4 does not include a display item that is not used for the actual shutdown operation, such as isolation of the exhaust heat recovery boiler HRSG_C of the gas turbine GT_C to be shut down first, and thus it can be prevented that the user is confused.

As described above, according to the second embodiment, the arrangement sequence of the display items of the activation elements can be matched with the GT activation sequence. Therefore, the user can understand the sequence of the full-automatic activation operation intuitively and accurately. By the blinking display of the activation element being currently operated, the user can identify the sequence of the activation operation more easily and accurately. Further, according to the second embodiment, the arrangement sequence of the display items of the shutdown elements can be matched with the GT shutdown sequence. Therefore, the user can understand the sequence of the full-automatic shutdown operation intuitively and accurately. By the blinking display of the shutdown element being currently operated, the user can identify the sequence of the shutdown operation more easily and accurately.

(Modification)

As a modification of the second embodiment, a display example of the activation progress screen when the number of gas turbines GT_A to GT_C to be activated is reduced and a display example of the shutdown progress screen when the number of gas turbines GT_A to GT_C to be shut down is reduced is described. In the explanations of the present modification, constituent elements corresponding to those of the multi-shaft combined-cycle power plant 1 in FIG. 1 are denoted by like reference characters and redundant explanations thereof will be omitted.

Figure 15:
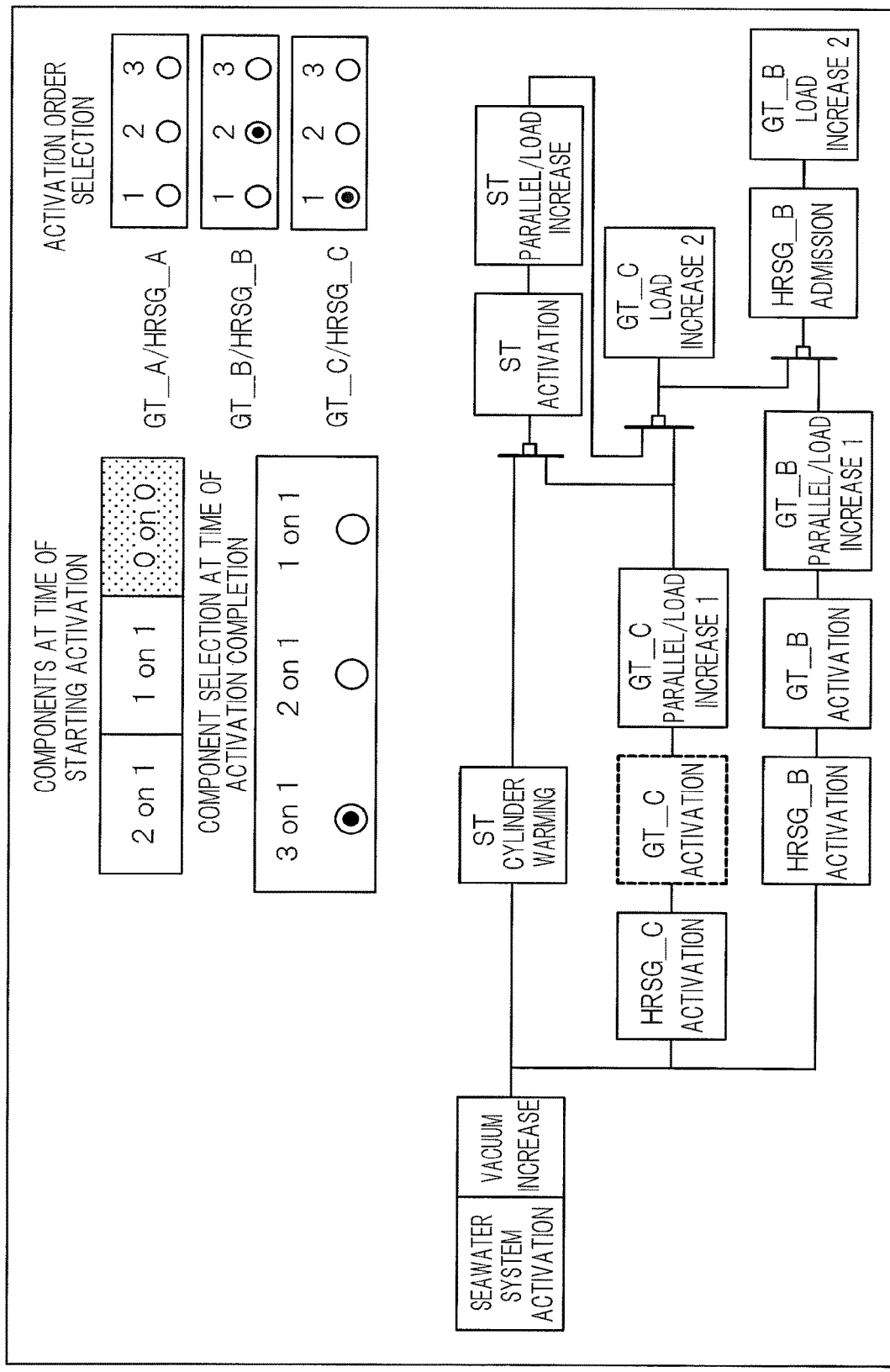
FIG. 15 is a diagram of an activation progress screen displayed by a plant operation method according to a modification of the second embodiment.

FIG. 15 is a diagram of the activation progress screen SC2 displayed by the plant operation method according to the modification of the second embodiment. The plant operation apparatus 10 according to the present modification is different from the plant operation apparatus 10 described with reference to FIG. 13, in the motion contents of the automation-progress display processing unit 13 in the activation operation. However, the basic motion algorithm is the same as that in FIG. 13, and a difference in the motion contents is due to reduction of the number of gas turbines GT to be activated. Specifically, the activation progress screen SC2 in FIG. 15 is a screen when a component at the time of activation completion "2 on 1" is selected and the activation sequence is set to gas turbines GT_C and GT_B, in a state with the gas turbine GT_C being activated in the state of 1 on 1 (the component at the time of starting activation "1 on 1"). In the activation setting screen SC1 for displaying the activation progress screen SC2 in FIG. 15, the activation order selection item "GT_C/HRSG_C" can be selected by default as sequence "1".

The activation progress screen SC2 in FIG. 15 does not include the display item of the activation element corresponding to the gas turbine GT_A, which is not activated. Accordingly, it can be prevented that the user is confused.

Figure 16:
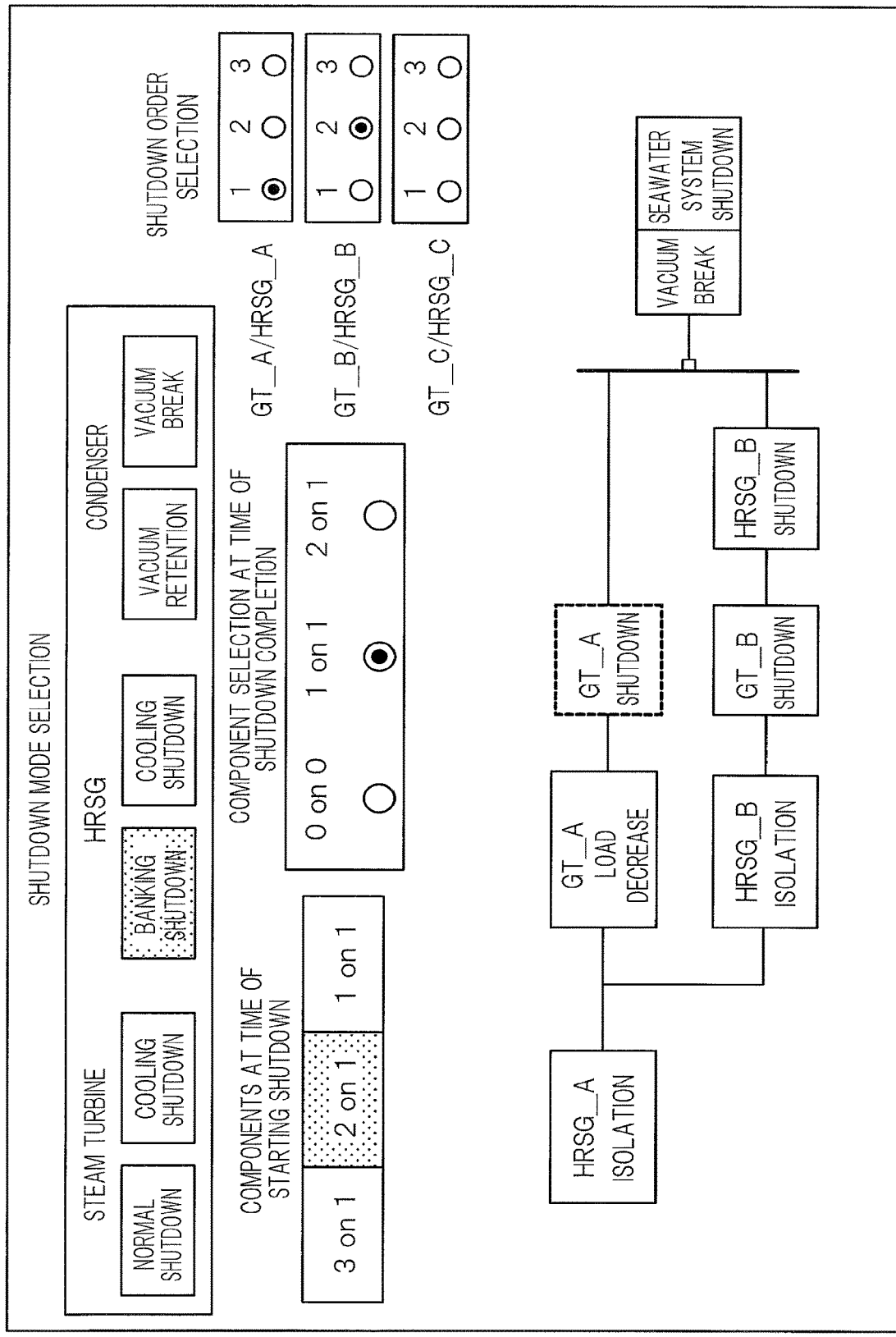
FIG. 16 is a diagram of a shutdown progress screen displayed by the plant operation method according to the modification of the second embodiment.

FIG. 16 is a diagram of the shutdown progress screen SC4 displayed by the plant operation method according to the modification of the second embodiment. The plant operation apparatus 10 according to the present modification is different from the plant operation apparatus 10 described with reference to FIG. 14 in the motion contents of the automation-progress display processing unit 13 in the shutdown operation. However, the basic motion algorithm is the same as that in FIG. 14, and a difference in the motion contents is due to reduction of the number of gas turbines GT to be shut down. Specifically, the shutdown progress screen SC4 in FIG. 16 is a screen when a component at the time of shutdown completion "1 on 1" is selected and the shutdown sequence is set to gas turbines GT_A and GT_B, in a state with the gas turbine GT_A having been shut down and the gas turbines GT_B and GT_C being operated (the component at the time of starting shutdown "2 on 1"). That is, the shutdown progress screen SC4 in FIG. 16 is a screen when the gas turbine GT_C is not shut down (is continuously operated). In the shutdown setting screen SC3 for displaying the shutdown progress screen SC4 in FIG. 16, the shutdown order selection item "GT_A/HRSG_A" can be selected by default as sequence "1".

The shutdown progress screen SC4 in FIG. 16 does not include the display item of the shutdown element corresponding to the gas turbine GT_C, which is not shut down. Accordingly, it can be prevented that the user is confused.

As described above, according to the second embodiment, the visibility of the activation/shutdown progress screen can be further improved by matching the arrangement sequence of the display items of the activation elements/shutdown elements with the activation/shutdown sequence of the gas turbines GT_A to GT_C.

The activation progress screen and the shutdown progress screen of the second embodiment can be applied to the activation operation and the shutdown operation in the semi-automatic mode described in the first embodiment.

The automation-progress display processing unit 13 can display the display items of the activation elements of the gas turbine that is not activated and the display items of the shutdown elements of the gas turbine that is not shut down in a display mode that can identify that the gas turbine is not an operation object (for example, by a broken line or in a pale color), instead of hiding the gas turbine.

Third Embodiment

Next, as a third embodiment, an embodiment of a plant operation apparatus having a general load controller is described. In the explanations of the third embodiment, constituent elements corresponding to those of the first embodiment are denoted by like reference characters and redundant explanations thereof will be omitted.

Figure 17:
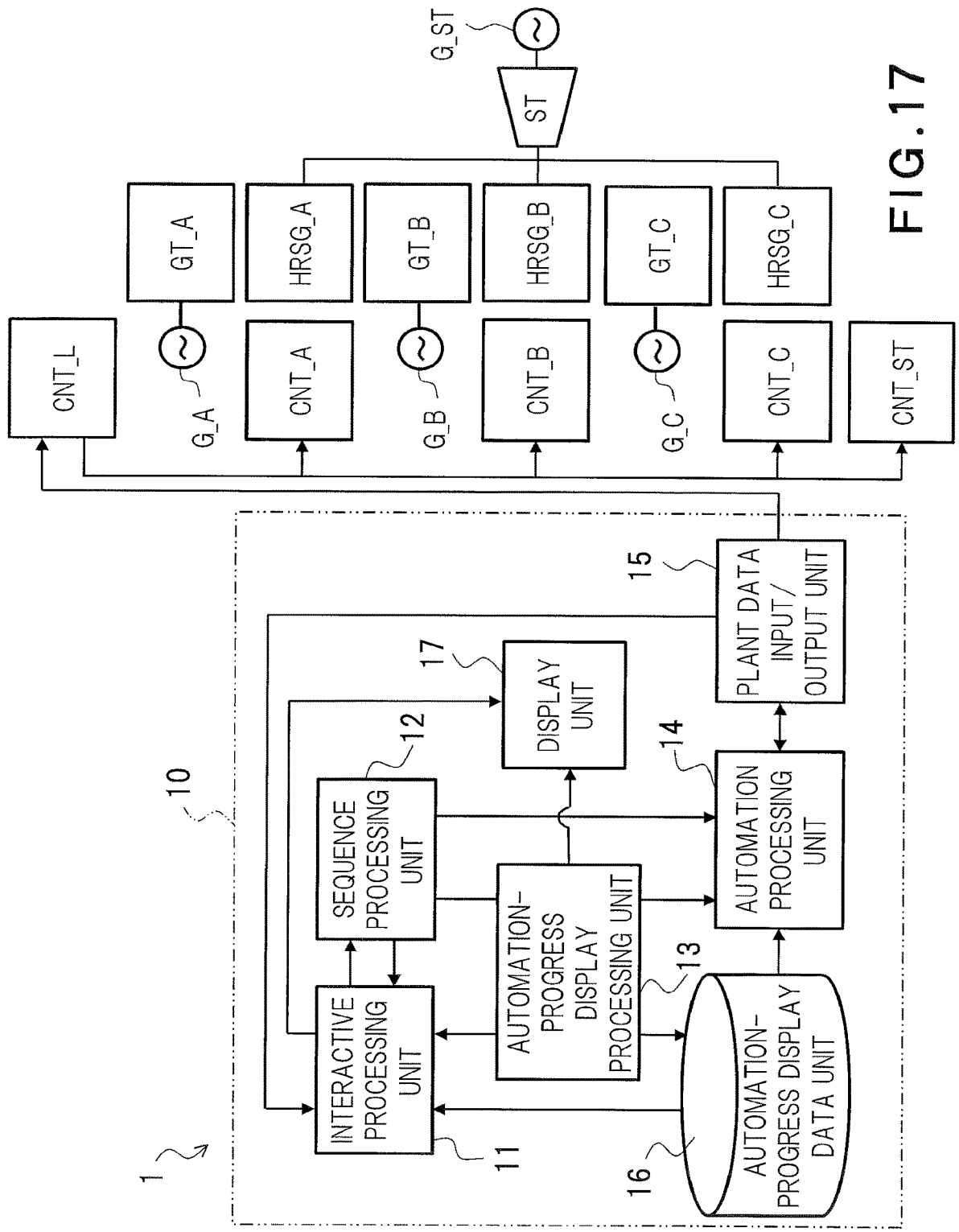
FIG. 17 is a block diagram of a multi-shaft combined-cycle power plant 1 according to a third embodiment.

FIG. 17 is a block diagram of the multi-shaft combined-cycle power plant 1 according to the third embodiment. The multi-shaft combined-cycle power plant 1 according to the third embodiment is different from the multi-shaft combined-cycle power plant 1 according to the first embodiment in that it further includes a general load controller CNT_L. The general load controller CNT_L controls the controllers CNT_A to CNT_C of the respective gas turbines GT_A to GT_C and the controller CNT_ST of the steam turbine ST comprehensively.

The automation processing unit 14 outputs an operation command of the activation element and an operation command of the shutdown element to the general load controller CNT_L. The general load controller CNT_L outputs the operation command input from the automation processing unit 14 to the controllers CNT_A to CNT_C and CNT_ST corresponding to the operation command.

By outputting the operation command to the general load controller CNT_L, it becomes possible to configure that each of the controllers CNT_A to CNT_C and CNT_ST is not affected by the computer load. Accordingly, each of the controllers CNT_A to CNT_C and CNT_ST can control each of the target devices GT_A to GT_C and ST stably and with less variation.

At least a part of the plant operation apparatus 10 according to the third embodiment can be configured by hardware or software. When the part of the plant operation apparatus 10 is configured by the software, a program that realizes at least a part of the functions of the plant operation apparatus 10 can be stored in a recording medium such as a flexible disk or a CD-ROM and read and executed by a computer. The recording medium is not limited to a detachable medium such as a magnetic disk or an optical disk, and can be a fixed recording medium such as a hard disk device or a memory. Further, a program that realizes at least a part of the functions of the plant operation apparatus 10 can be distributed via a communication line (including wireless communication) such as the Internet. Furthermore, the program can be distributed via a wired line or a wireless line such as the Internet or by being stored in a recording medium, in an encrypted, modulated, or compressed state.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A plant operation apparatus that operates a multi-shaft combined-cycle power plant including at least a plurality of gas turbines as a plurality of devices to be operated, the plant operation apparatus comprising:
a display unit;
an interactive processing unit that can display on the display unit an activation setting screen on which activation sequence in an activation operation of the gas turbines and number of gas turbines to be in an operating state after the activation operation can be selected, and a shutdown setting screen on which shutdown sequence in a shutdown operation of the gas turbines and number of gas turbines to be in an operating state after the shutdown operation can be selected;
a sequence processing unit that can generate activation sequence information in which activation elements of the respective devices to be operated, required for the activation operation, are arranged in order according to activation sequence and number selected on the activation setting screen, and shutdown sequence information in which shutdown elements of the respective devices to be operated, required for the shutdown operation, are arranged in order according to shutdown sequence and number selected on the shutdown setting screen;

an automation processing unit that can output an operation command of the activation element of the respective devices to be operated based on the activation sequence information and a current plant operating state, and an operation command of the shutdown element of the respective devices to be operated based on the shutdown sequence information and a current plant operating state; and a display processing unit that can display on the display unit an activation progress screen in which a plurality of display items indicating the activation elements of the respective devices to be operated are arranged based on the activation sequence information, and/or a shutdown progress screen in which a plurality of display items indicating the shutdown elements of the respective devices to be operated are arranged based on the shutdown sequence information, wherein the automation processing unit outputs the operation command to a general load controller that controls the respective devices to be operated comprehensively, the display processing unit displays the activation progress screen in a display mode capable of identifying sequence of the activation elements of the respective devices to be operated, and/or the shutdown progress screen in a display mode capable of identifying sequence of the shutdown elements of the respective devices to be operated, the display processing unit displays the activation progress screen in a manner that when an activation element requires completion of multiple activation elements in previous steps then lines extending from each of multiple activation elements in previous steps are combined and connected to an activation element in a subsequent step, and/or the shutdown progress screen in a manner that when a shutdown element requires completion of multiple shutdown elements in previous steps then lines extending from each of multiple shutdown elements in previous steps are combined and connected to a shutdown element in a subsequent step, an arrangement sequence of the display items on the activation progress screen does not match with an actual activation operation sequence because of that the display items on the activation progress screen include a display item indicating an activation element not required to be operated according to the activation sequence information, and/or an arrangement sequence of the display items on the shutdown progress screen does not match with an actual shutdown operation sequence because of that the display items on the shutdown progress screen include a display item indicating an shutdown element not required to be operated according to the shutdown sequence information, and the display processing unit displays a display item indicating an activation element to be operated next of the display items on the activation progress screen in a display mode different from a display mode of other display items based on the activation sequence information and a current plant operating state to compensate the mismatch between the arrangement sequence of the display items on the activation progress screen and the actual activation operation sequence, and/or a display item indicating a shutdown element to be operated next of the display items on the shutdown progress screen in a display mode different from a display mode of other display items based on the shutdown sequence information and a current plant operating state to compensate the mismatch between the arrangement sequence of the display items on the shutdown progress screen and the actual shutdown operation sequence.

2. The apparatus of claim 1, wherein the display processing unit performs blinking display of the specific display item.

3. The apparatus of claim 1, further comprising an automation processing unit that can output an operation command of an activation element of the respective devices to be operated based on the activation sequence information and a current plant operating state, and/or an operation command of a shutdown element of the respective devices to be operated based on the shutdown sequence information and a current plant operating state, wherein the display processing unit displays a display item indicating the activation element to be operated next in a selectable display mode, and/or displays a display item indicating the shutdown element to be operated next in a selectable display mode, and the automation processing unit outputs an operation command of the activation element when the display item indicating the activation element to be operated next is selected, and/or outputs an operation command of the shutdown element when the display item indicating the shutdown element to be operated next is selected.

4. A plant operation method of operating a multi-shaft combined-cycle power plant including at least a plurality of gas turbines as a plurality of devices to be operated, the method comprising:

displaying an activation setting screen on which activation sequence in an activation operation of the gas turbines and number of gas turbines to be in an operating state after the activation operation can be selected, and a shutdown setting screen on which shutdown sequence in a shutdown operation of the gas turbines and number of gas turbines to be in an operating state after the shutdown operation can be selected;

generating activation sequence information in which activation elements of the respective devices to be operated, required for the activation operation, are arranged in order according to activation sequence and number selected on the activation setting screen, and shutdown sequence information in which shutdown elements of the respective devices to be operated, required for the shutdown operation, are arranged in order according to shutdown sequence and number selected on the shutdown setting screen;

outputting an operation command of the activation element of the respective devices to be operated based on the activation sequence information and a current plant operating state, and an operation command of the shutdown element of the respective devices to be operated based on the shutdown sequence information and a current plant operating state; and displaying an activation progress screen in which a plurality of display items indicating the activation elements of the respective devices to be operated are arranged based on the activation sequence information, and/or a shutdown progress screen in which a plurality of display items indicating the shutdown elements of the respective devices to be operated are arranged based on the shutdown sequence information, wherein the operation command is outputted to a general load controller that controls the respective devices to be operated comprehensively, the activation progress screen is displayed in a display mode capable of identifying sequence of the activation elements of the respective devices to be operated, and/or the shutdown progress screen is displayed in a display mode capable of identifying sequence of the shutdown elements of the respective devices to be operated, the activation progress screen is displayed in a manner that when an activation element requires completion of multiple activation elements in previous steps then lines extending from each of multiple activation elements in previous steps are combined and connected to an activation element in a subsequent step d, and/or the shutdown progress screen is displayed in a manner that when a shutdown element requires completion of multiple shutdown elements in previous steps then lines extending from each of multiple shutdown elements in previous steps are combined and connected to a shutdown element in a subsequent step, an arrangement sequence of the display items on the activation progress screen does not match with an actual activation operation sequence because of that the display items on the activation progress screen include a display item indicating an activation element not required to be operated according to the activation sequence information, and/or an arrangement sequence of the display items on the shutdown progress screen does not match with an actual shutdown operation sequence because of that the display items on the shutdown progress screen include a display item indicating an shutdown element not required to be operated according to the shutdown sequence information, and a display item indicating an activation element to be operated next of the display items on the activation progress screen is displayed in a display mode different from a display mode of other display items based on the activation sequence information and a current plant operating state to compensate the mismatch between the arrangement sequence of the display items on the activation progress screen and the actual activation operation sequence, and/or a display item indicating a shutdown element to be operated next of the display items on the shutdown progress screen is displayed in a display mode different from a display mode of other display items based on the shutdown sequence information and a current plant operating state to compensate the mismatch between the arrangement sequence of the display items on the shutdown progress screen and the actual shutdown operation sequence.

5. A non-transitory computer-readable recording medium in which a plant operation program for operating a multi-shaft combined-cycle power plant including at least a plurality of gas turbines as a plurality of devices to be operated is recorded, the plant operation program causing a computer to perform:

a procedure of displaying an activation setting screen on which activation sequence in an activation operation of the gas turbines and number of gas turbines to be in an operating state after the activation operation can be selected, and a shutdown setting screen on which shutdown sequence in a shutdown operation of the gas turbines and number of gas turbines to be in an operating state after the shutdown operation can be selected;

a procedure of generating activation sequence information in which activation elements of the respective devices to be operated, required for the activation operation, are arranged in order according to activation sequence and number selected on the activation setting screen, and shutdown sequence information in which shutdown elements of the respective devices to be operated, required for the shutdown operation, are arranged in order according to shutdown sequence and number selected on the shutdown setting screen;

a procedure of outputting an operation command of the activation element of the respective devices to be operated based on the activation sequence information and a current plant operating state, and an operation command of the shutdown element of the respective devices to be operated based on the shutdown sequence information and a current plant operating state; and a procedure of displaying an activation progress screen in which a plurality of display items indicating the activation elements of the respective devices to be operated are arranged based on the activation sequence information, and/or a shutdown progress screen in which a plurality of display items indicating the shutdown elements of the respective devices to be operated are arranged based on the shutdown sequence information-wherein the operation command is outputted to a general load controller that controls the respective devices to be operated comprehensively, the activation progress screen is displayed in a display mode capable of identifying sequence of the activation elements of the respective devices to be operated, and/or the shutdown progress screen is displayed in a display mode capable of identifying sequence of the shutdown elements of the respective devices to be operated, the activation progress screen is displayed in a manner that when an activation element requires completion of multiple activation elements in previous steps then lines extending from each of multiple activation elements in previous steps are combined and connected to an activation element in a subsequent step, and/or the shutdown progress screen is displayed in a manner that when a shutdown element requires completion of multiple shutdown elements in previous steps then lines extending from each of multiple shutdown elements in previous steps are combined and connected to a shutdown element in a subsequent step, an arrangement sequence of the display items on the activation progress screen does not match with an actual activation operation sequence because of that the display items on the activation progress screen include a display item indicating an activation element not required to be operated according to the activation sequence information, and/or an arrangement sequence of the display items on the shutdown progress screen does not match with an actual shutdown operation sequence because of that the display items on the shutdown progress screen include a display item indicating an shutdown element not required to be operated according to the shutdown sequence information, and a display item indicating an activation element to be operated next of the display items on the activation progress screen is displayed in a display mode different from a display mode of other display items based on the activation sequence information and a current plant operating state to compensate the mismatch between the arrangement sequence of the display items on the activation progress screen and the actual activation operation sequence, and/or a display item indicating a shutdown element to be operated next of the display items on the shutdown progress screen is displayed in a display mode different from a display mode of other display items based on the shutdown sequence information and a current plant operating state to compensate the mismatch between the arrangement sequence of the display items on the shutdown progress screen and the actual shutdown operation sequence.

* * * * *